United States Patent [19]

Theile et al.

[11] Patent Number: 4,972,484
[45] Date of Patent: Nov. 20, 1990

[54] METHOD OF TRANSMITTING OR STORING MASKED SUB-BAND CODED AUDIO SIGNALS

[75] Inventors: Günther Theile, Thanning; Gerhard Stoll, Zolling; Martin Link, Unterschleissheim, all of Fed. Rep. of Germany

[73] Assignee: Bayerische Rundfunkwerbung GmbH, Munich, Fed. Rep. of Germany

[21] Appl. No.: 238,350

[22] PCT Filed: Nov. 20, 1987

[86] PCT No.: PCT/EP87/00723
§ 371 Date: Jul. 21, 1988
§ 102(e) Date: Jul. 21, 1988

[87] PCT Pub. No.: WO88/04117
PCT Pub. Date: Jun. 2, 1988

[30] Foreign Application Priority Data

Nov. 21, 1986 [DE] Fed. Rep. of Germany ....... 3639753

[51] Int. Cl.⁵ .............................................. G10L 7/02
[52] U.S. Cl. ...................................................... 381/37
[58] Field of Search ................................. 381/29–41; 364/513.5; 375/25–27, 122

[56] References Cited

U.S. PATENT DOCUMENTS

| 4,538,234 | 8/1985 | Honda et al. ........................ 381/31 |
| 4,569,075 | 2/1986 | Nussbaumer ........................ 381/29 |
| 4,831,636 | 5/1989 | Taniguchi et al. ................... 375/27 |

FOREIGN PATENT DOCUMENTS

| 0064119 | 11/1982 | European Pat. Off. . |
| 0193143 | 9/1986 | European Pat. Off. . |
| 3440613 | 4/1986 | Fed. Rep. of Germany . |
| 3506912 | 8/1986 | Fed. Rep. of Germany . |

OTHER PUBLICATIONS

Crochiere, "Sub-Band Coding", The Bell System Technical Journal, vol. 60, No. 7, 9/81, pp. 1633–1653.
Journal of the Audio Engineering Society, 1979 Nov., vol. 27, No. 11 "An All-Digital 'Commentary Grade' Subband Coder", J. D. Johnston and R. E. Crochiere, pp. 855–865.
IEEE Transactions on Acoustics, Speech, and Signal Processing, vol. ASSP-30, No. 5, Oct. 1982. "Subband Coder Design Incorporating Recursive Quadrature Filters and Optimum ADPCM Coders", Thomas P. Barnwell, III, pp. 751–765.
RTM, vol. 30, No. 3, May/Jun. 1986, Ein Verfahren Zur Datenredukton Bei Diytalen Audiosignalen Unter Ausnutzung Psychookustischer Phänomene, von Derlefkrahe, pp. 117–123.
8089 IEEE Transactions on Communications, Com-33(1985), Oct. No. 10, New York, U.S.A. "Digital Speech Interpolation for Variable Rate Coders with Application to Subband Coding", Kuel Young Kou et al., pp. 1100–1108.

Primary Examiner—Dale M. Shaw
Assistant Examiner—John A. Merecki
Attorney, Agent, or Firm—Spencer & Frank

[57] ABSTRACT

In the transmission of audio signals, the audio signal is digitally represented by use of quadrature mirror filtering in the form a plurality of spectral sub-band signals. The quantizing of the sample values in the sub-bands, e.g. 24 sub-bands, is controlled to the extent that the quantizing noise levels of the individual sub-band signals are at approximately the same level difference from the masking threshold of the human auditory system resulting from the individual sub-band signals. The differences of the quantizing noise levels of the sub-band signals with respect to the resulting masking threshold are set by the difference between the total information flow required for coding and the total information flow available for coding. The available total information flow is set and may then fluctuate as a function of the signal.

29 Claims, 21 Drawing Sheets $q_{ta}$: Data flow of transcoded sample values of the subbands $q_{ta} + q_{sf} + q_{si}$ : Data flow of coded subband signals

METHOD OF TRANSMITTING OR STORING MASKED SUB-BAND CODED AUDIO SIGNALS

BACKGROUND OF THE INVENTION

The invention relates to a method of transmitting or storing digitalized audio signals, wherein an audio signal is digitally represented by a plurality of spectral quantized components.

In connection with the transmission of digital audio signals it is known from the following publications: ("Journal of Audio Engineering Society," November, 1979, Volume 27, No. 11, pages 855-865; "The Bell System Technical Journal," September, 1981, pages 1633-1653; and "IEEE Transactions on Acoustics, Speech and Signal Processing, " Vol. ASSP-30, No. 5, October 1982, pages 751-765), to subdivide a broadband digital audio signal by means of a QMF (quadrature mirror filter) filter bank into a number of sub-band signals according to a linear quantization and to subject the resulting sub-band signals to a data reduction, for example, by means of adaptive PCM or DPCM coding.

It is also known from German Patent No. 3,440,613 to select the quantization of the useful information within each sub-band signal so that the quantizing noise is just covered by the useful information in the same sub-band, which can also result in data reduction. The data reduction factor realizable with the prior art method has approximately a value of four, i.e. the information flow of a high-quality digital audio signal is reduced from about 500 kbit/s to about 125 kbit/s without any subjective reduction in quality occurring.

To realize an even further data reduction, it is also known from (European Patent No. 0,193,143, DE-OS 3,506,912 and "Rundfunktechnische Mitteilungen" [Radio Engineering News], Volume 30 (1986), No. 3, pages 117-123), to perform a spectral analysis of the broadband audio signal with the aid of a discrete Fourier transformation (for example, by means of a fast-Fourier transformation) and to code certain relevant spectral values within different frequency groups according to magnitude and phase so that greater data reduction is realized by considering masking properties of the human auditory system defined by masking thresholds and according to different quality criteria.

The analysis time window required for the Fourier transformation, however, is about 25 ms. This value constitutes a compromise to meet the requirements, on the one hand, for spectral resolution and, on the other hand, for temporal resolution of the human auditory system. The spectral resolution that can be realized with this analysis time window is merely 40 Hz so that, in the range of low frequencies, where the frequency group width of the human auditory system is about 100 Hz, only two spectral values can be transmitted. The resulting sidebands therefore lie in adjacent frequency groups so that perceptible reductions in quality cannot be excluded. On the other hand, the 25 ms analysis time window selected as a compromise is too long for the time resolution of the human auditory system. Since for pulses containing useful signals, this inaccuracy in the time domain leads to noticeable distortions. The amplitude values of the spectral components preceding in time must be raised in order to reduce distortion, but this does not lead to the desired success in all cases. Moreover, in digital audio studio technology, block lengths of about 5 ms must not be exceeded so that inaudible cuts are possible when digitalized audio signals are edited. Additionally, processor expenditures, particularly in the receiver, for the retransformation of signals in the high frequency range transformed at the transmitter are unnecessarily high since the consideration of psychoacoustic criteria occurs only by frequency groups.

Additionally, in the prior art method discussed last, the recovery of spectral values in the receiver according to magnitude and phase and the inverse Fourier transformation in the receiver requires the transmission of secondary information. The secondary information represents a relatively high percentage of the entire net information flow and requires particularly effective error protection which correspondingly increases the flow of information in the coded signal to be transmitted. Finally, in the prior art method, the source coded signal is sensitive to bit error interferences because the magnitude as well as the phase of each spectral value is transmitted in blocks, i.e. only about once every 25 ms, so that a bit error produces an interference spectrum within this time interval. The interfering effect of a 25 ms pulse is significantly higher than, for example, that of a 1 ms pulse which results in the above-mentioned prior, art sub-band methods for the faulty transmission of a sub-band sample value.

SUMMARY OF THE INVENTION

It is an object of the invention to fully utilize the masking properties of the human auditory system in a method of the above-mentioned type, while avoiding a Fourier transformation, so that a limited total information flow is dynamically distributed to the spectral components of the useful signal. It is a further object to distribute an information flow to spectral components of useful signals with the best possible quality without the high expenditures associated with the prior art regarding the transmission of secondary information, error protection or signal processing in the receiver.

This is accomplished by quantizing sub-band signals on the basis of level values determined for each sub-band component or on the basis of level information derived therefrom so that quantizing noise levels of individual components have approximately the same level difference from calculated masking thresholds of the individual components. The differences of the quantizing noise levels of the components are set by the difference between the required total information flow and the total information flow available for coding.

Advantageous features and modifications of the method according to the invention can be achieved as discussed below.

The invention is based on the consideration that mutual masking of the spectral components of a useful signal, as well as masking of the quantizing noise take place not only within respective sub-bands, but over several adjacent sub-bands. To fully utilize this masking effect, the quantizations of sub-band signals must be controlled according to the masking threshold resulting from the various spectral components of the useful signal. The calculation of the control information required for this purpose is effected as a function of the signal by considering pre-masking, simultaneous masking and post-masking of the human auditory system. Since, on the one hand, the required total information flow of a thus coded audio signal fluctuates as a function of the signal and if, on the other hand, the information transmission flow of a transmitted coded audio signal is to be kept constant, a resulting signal-dependent information flow reserve can be utilized at the transmitter by considering additional criteria. In particular, the signal-dependent information flow reserve can be made available completely or in part for the quantization of the sub-band signals so that differences between the quantizing noise levels of the sub-band signals and the resulting masking threshold are increased. The information flow reserve can be made available completely or in part as error protection for the coded sub-band signals transmitted in a multiplex operation and for the error protection of a multiplex frame so that the degree of error protection in the multiplex signal is increased.

BRIEF DESCRIPTION OF THE DRAWINGS

The invention will be described in greater detail below with reference to the drawing figures. It is shown in:

FIG. 4, an example for the audio signal dependent time curve of the total information flow required for coding;

OVERALL SCHEME

DESCRIPTION OF THE PREFERRED EMBODIMENTS

Figure 1A:
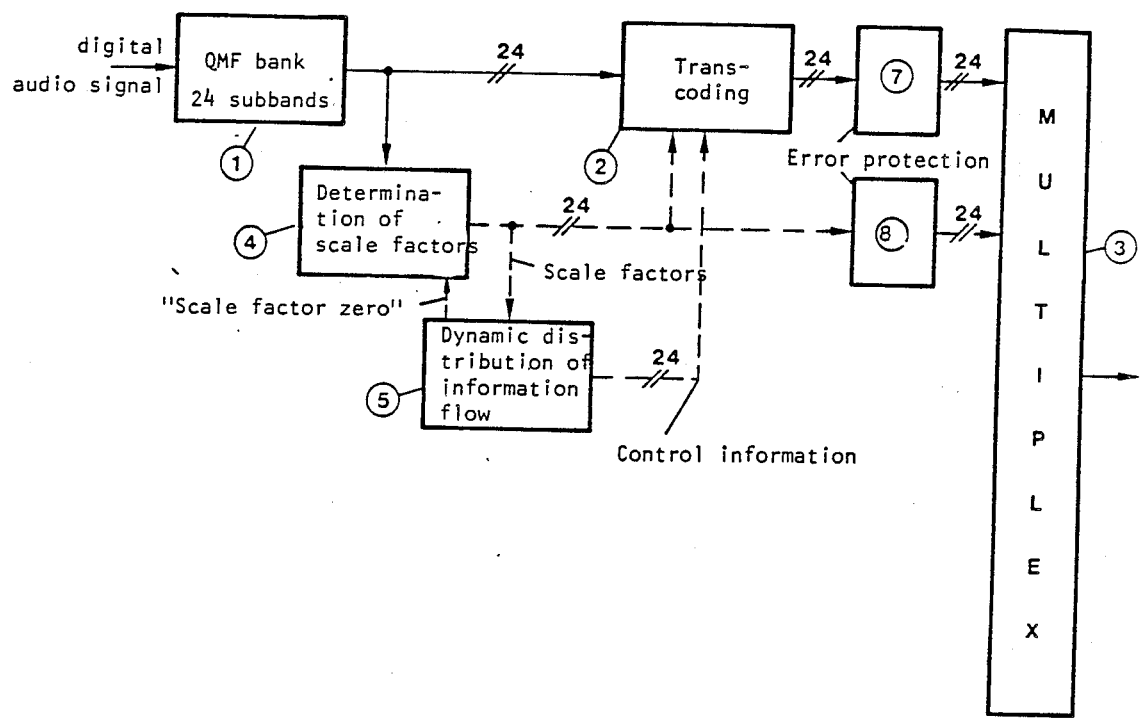
FIGS. 1A and 2A, block circuit diagrams of the circuit components at the transmitter and receiver for implementation of the method according to the invention according to a first embodiment.

As shown in FIG. 1A, a digitalized audio signal, e.g. a high-quality radio signal, is subdivided into a number of sub-band signals, for example 24 sub-band signals. The splitting of the digital audio signal into sub-bands is preferably effected with the aid of a filter bank 1 composed of quadrature mirror filters (QMF) whose configuration and operation is shown in greater detail in FIG. 10 and will be described below. The input signal for filter bank 1 has, for example, a bandwidth of 16 kHz and is linearly quantized with a resolution of 16 bits. Greater bandwidths and resolutions are also possible, for example 20 kHz and 18 bits.

The high information flow of the 24 sub-band signals present at the output of filter bank 1 is reduced in a subsequently connected transcoding stage 2. The transcoded sub-band signals are subjected to a special error protection stage 7 which will be described in greater detail below, and are fed to a multiplexer 3 which feeds the 24 sub-band signals of the embodiment in time multiplex to a transmission path, for example a radio transmission path.

Redundancy reducing as well as irrelevance reducing methods can be used to reduce the information flow, with combinations of the two methods also being conceivable. Redundancy reducing methods suppress information which is not required for reconstruction of the original signal. In contrast thereto, irrelevance reducing methods reduce information which is not required by the human auditory system to distinguish the reconstructed signal from the original signal. For example, in an irrelevance reducing method, the quantization of a useful signal within each sub-band is selected in such a manner that the quantizing noise is just covered by the useful signal. In an irrelevance and redundancy reducing method, redundancy reducing methods, for example adaptive PCM or DPCM processors, are used on the sub-bands and are designed in such a way that the reconstruction of the original signal is not completely possible, but the resulting error signal is masked by the useful signal.

A suitable embodiment of combined irrelevance and redundancy reduction in the sub-bands will be described below. Quantizing of the sub-band signals is effected on the basis of the masking threshold and on the basis of scale factors. The scale factors classify the peak values of the sub-band signal levels within a time interval which corresponds to the time resolution capability of the human auditory system. They are subjected to an additional irrelevance and redundancy reduction.

Transmission occurs in the multiplex signal, with error protection stage 8 having special characteristics which will be described later.

Dynamic Information Flow Distribution

An invariant distribution of the information flow to the sub-bands is unfavorable in the sense of optimum irrelevance reduction because the curve of the masking threshold is a function of the spectral and time structure of the useful signal. Therefore, according to the invention, the quantizations of the sub-band signals are controlled in stage 2 ("dynamic distribution" of the available information flow to the sub-bands).

The control signals for the quantizations of the sub-band signals in transcoding stage 2 are obtained in a stage 5 on the basis of the spectral and temporal masking thresholds of the human auditory system. Under control of these control signals in stage 2, the information flow is dynamically distributed to the individual sub-bands by considering pre-masking, simultaneous masking and post-masking by the human auditory system, as will be described in detail below with reference to FIGS. 5 to 8. This includes
  (a) no or only partial transmission of the sub-bands of the useful signal covered by adjacent sub-bands of the same useful signal; and
  (b) quantization of sub-bands of the useful signal not (completely) covered by adjacent sub-bands of the same useful signal only to such a degree of fineness that the resulting quantizing noise is covered by the higher useful signal level of the adjacent sub-band signals.

In this way it is possible to realize a higher irrelevance reduction than in the prior art.

Prior art methods realize a reduction of the information flow in that the quantization of the sub-band signals occurs on the basis of the masking effective within a sub-band. For example, for a purely irrelevance reducing method, approximately the relationship given in German Patent No. 3,440,613 applies:

$$ld\ q_{i\ min} = 32\ lg\left(\frac{f_{oi}}{f_{ui}}\right) + 1\ \left[\frac{bit}{sample\ value}\right] \quad (1)$$

where
  $q_{i\ min}$ is the minimum number of quantizing stages in sub-band i;
  $f_{oi}$, $f_{ui}$ are the upper and lower, cutoff, frequencies, respectively, of sub-band i.
The resulting required information flow for all sub-bands then results as follows:

$$r_{min} = 2 \cdot \sum_{i=1}^{n} (f_{oi} - f_{ui}) \cdot ld\ q_{i\ min}\ [bit/s] \quad (2)$$

The resulting required information flow is constant, for a resolution in 24 sub-bands it is approximately 100 kbit/s.

This value is reduced under consideration of the mutual masking of the sub-band signals. For example, for an approximate uniform masking of a broadband useful signal, the resolution of all sub-bands lying on the frequency axis above the first sub-band can be reduced in such a manner that the required information flow is reduced by about 30%. For a narrowband useful signal, a greater data reduction is possible, in principle, because the information flow can be set to zero in many sub-bands.

In principle, the signal dependent controlled quantizations of the sub-band signals lead to a required information flow which is substantially a function of the spectral and time structure of the useful signal and thus, fluctuates in dependence on the signal, approximately over a range from 20 to 70 kbit/s. The advantageous utilization of an information flow that fluctuates in dependence on the signal will be discussed in greater detail below.

Scale Factor

In the embodiment according to FIG. 1A, transcoding of the sub-band signals is effected not only on the basis of the masking threshold criterion in the sense of reducing irrelevance under the controls of stage 5, but also on the basis of scale factors which classify the peak values of the sub-band signal levels within a certain time interval and fix the resolution of each sub-band signal within the time interval for the transcoding process. Details of the determination of the scale factors in stage 4 and their evaluation during transcoding in stage 2 as well as their transmission will be described in greater detail below. Scale factors for the sub-band signals are of advantage for three reasons:
  1. The scale factors for the sub-band signals contain all the information required for a determination of the control variable according to the masking threshold criterion in stage 5. The transmission of scale factors as secondary information is therefore sufficient to perform inverse transcoding at the receiver (see FIG. 2A). The received scale factors provide information regarding the distribution of the total information flow to the sub-bands.
  2. Since the peak value of the sub-band signal level as classified by the scale factor cannot be exceeded by, the sample values of the respective sub-band signal, the noise level within each sub-band, produced by bit errors, is consequently unable to exceed the peak value of the sub-band signal level by more than the classification accuracy. Thus, in principle, bit errors produce a noise spectrum which is for the most part masked by the useful signal. Even if there are maximum bit errors, i.e. complete destruction of all sample values, the scale factor still present in this case ensures that the spectral envelope curve of the noise spectrum approximately corresponds to the envelope curve of the useful signal, i.e. a speaking voice can still be understood.
  3. Since the scale factors of the sub-band signals contain all the essential informations required for a determination of the control variable according to the masking threshold criterion, it is necessary to greatly protect this information against bit errors during transmission. This can be done, for example, by introducing redundancy. Because of this introduction of redundancy, it is particularly important to minimize the transmission of scale factors. This can be accomplished by a minimum required word length (see section entitled Scale Factor Formation) and a transmission repetition rate which is a function of the statistics of the signal and the requirements of the human auditory system.

The requirements of the human auditory system can be met in that temporal masking, primarily the effect of post-masking is utilized (irrelevance reduction). This means that with the audio signal decaying quickly, the scale factors need not be determined accurately but can be approximated on the basis of interpolations of scale factors determined at earlier and later points in time. Since temporal pre-masking is generally very short and highly dependent on the signal (1 to 20 ms), the scale factors must be transmitted more frequently in cases where the signals rise quickly.

Redundancy reduction during transmission of the scale factors is met in that for such sub-band signals whose levels do not change or change only slightly over a certain period of time the scale factors are transmitted only rarely.

Due to the fact that scale factors need not necessarily be transmitted per time block for all sub-bands, but can also be determined by means of interpolation mechanisms in dependence on the requirements of the human auditory system and of the audio signal, respectively, a transmission rate for all scale factors of about 10 to 20 kbit/s results.

Since at the receiver, transcoding, is, controlled only by the detected scale factors, the sub-band coded multiplex signals are particularly insensitive to bit error interference if the scale factors are subjected to effective error protection in stage 8 of the transmitter. The advantage of using scale factors compared to other data reducing methods, for example adaptive PCM or DPCM, thus lies in the fact that high insensitivity to bit errors is realized if only the flow of secondary information caused by the scale factors is effectively protected. The magnitude of this flow of secondary information fluctuates in dependence on the signal approximately over a range from 10 to 20 kbit/s because, for the purpose of reducing irrelevance and redundancy, the time intervals (block lengths) on which the determination of the scale factors is based correspond to the temporal masking of the human auditory system and to the time structure of the respective sub-band signal.

Thus, for the transmission of transcoded sub-band signals and scale factors, a total information flow is required which fluctuates in dependence on the signal over a range from 30 to 90 kbit/s.

Utilization of the Fluctuating Flow of Information

The signal-dependent fluctuation of the total information flow required for coding can be utilized to advantageously configure the method according to the invention.

Figure 14:
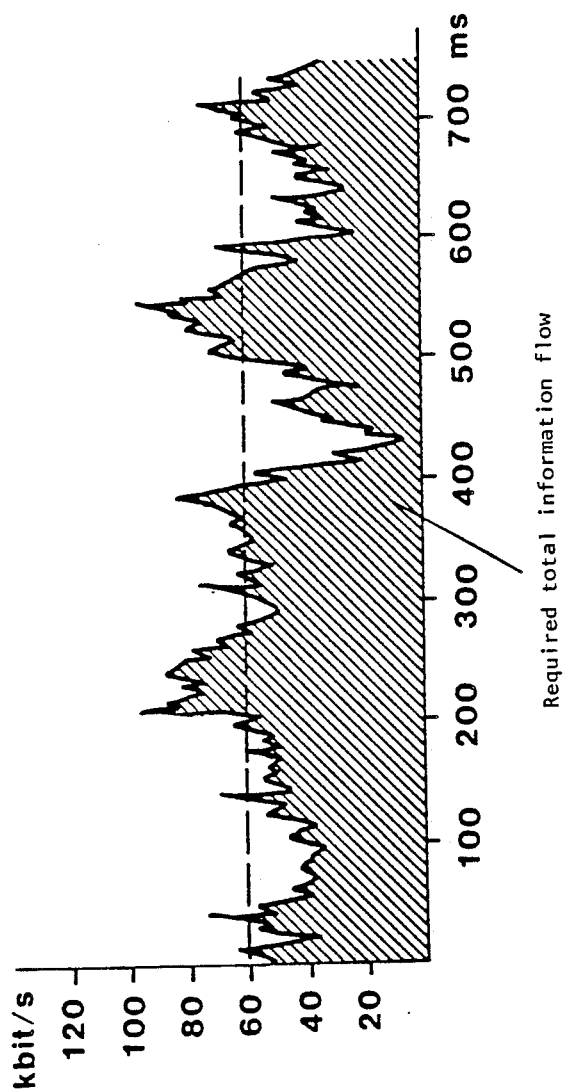

FIG. 14 shows as an example a curve over time of the required total information flow. The dashed line represents the average required total information flow (about 60 kbit/s). This value could be used as a basis if all fluctuations within a large time interval could be equalized with the aid of a correspondingly large buffer memory. This is not possible for the case of an audio signal transmission because of the correspondingly long delay involved, but for audio signal storage there results a first advantageous configuration of the method according to the invention:

(1) The flow of information in the multiplex signal fluctuates.

If the multiplex signal is configured that the information flow fluctuates in a similar manner at the output of multiplexer 3 of FIG. 1A as the total information flow used for the coded audio signal at the inputs of stages 7 and 8, a particularly high data reduction results for the case of storage. For special storage techniques, for example storage on magnetic computer discs, stages 3, 7 and 8 may even be omitted so that the total information flow to be stored need not be higher than the required total information flow.

The long-term average of the total information flow to be stored may even lie below 60 kbit/s because if a complete broadcast is stored, all short-term pauses (for example in speaking) contained therein require only a very small total information flow (about 10 to 15 kbit/s, primarily for the scale factors). Thus less than 40 kbit/s can form the basis for the storage of speech.

(2) The flow of information in the multiplex signal is constant.

In the case of transmission of the multiplex signal, its constant information flow is of advantage. Since the delay caused by the buffer memory must be only slight, fluctuations in the required total information flow can be compensated only slightly. The remaining fluctuations are shown in an exemplary manner in FIG. 15. The constant flow of information in the multiplex signal is indicated by the dashed line (90 kbit/s). Thus, the upper region represents an information flow reserve which fluctuates in dependence on the signal and can be utilized in various ways:

(a) for a greater distance of the quantizing noise level from the resulting masking threshold ("increased signal to noise ratio");

(b) for error protection stages 7 and 8 and the formation of the multiplex signal in stage 3 ("dynamic error protection");

(c) for the transmission of any desired additional information in the multiplex signal which is not critical with respect to time and is independent of the audio signal, e.g. schedule information or radio text information ("transmission of additional signals").

Of course, the information flow reserve can be utilized in any desired combination of the three possibilities. The increased signal to noise ratio and dynamic error protection will be described in greater detail below.

The following applies for the dynamic signal to noise ratio:

Source coding methods which completely remove the irrelevance of the digital audio signals (i.e., which fully utilize the effect of spectral pre-masking, simultaneous masking and post-masking) may cause problems in certain cases of application:

In cases where source coding methods are employed in cascade, the quantizing noise may exceed the masking thresholds. If, for example, the storage as well as the transmission of a radio program signal were to take place with the aid of such a source coding method, reductions in quality could become perceptible for critical audio signals.

In the case of subsequent raising or lowering of certain frequency components of the useful signal at the receiver, the spectral masking of the useful signal may change to such an extent that reductions in quality become perceptible. This danger exists if the level of a sub-band signal which masks adjacent sub-band signals is lowered at the receiver or if the level of a sub-band signal which is completely or partially masked by an adjacent sub-band signal is raised at the receiver.

Figure 15:
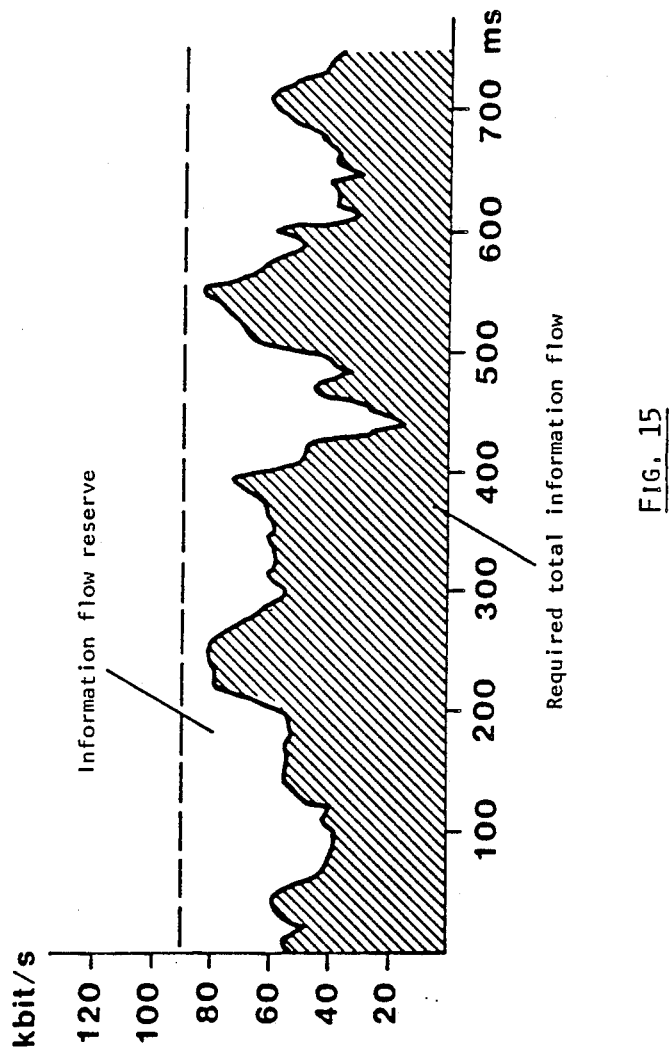
FIG. 15, an example for the audio signal dependent time curve of the total information flow required for coding and the information flow reserve if the information flow in the multiplex signal is kept constant.
Figure 16:
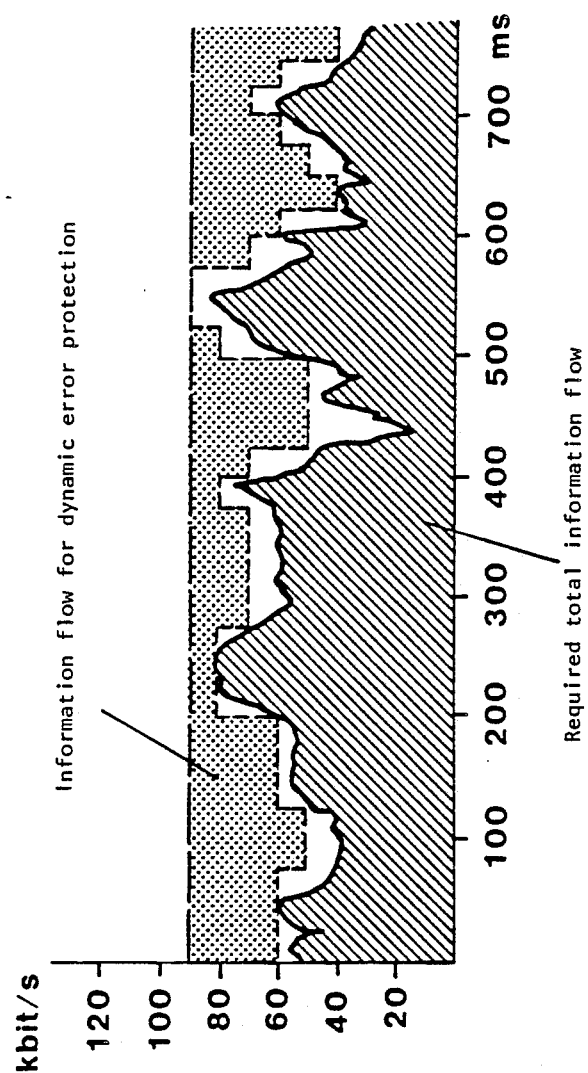
FIG. 16, an example for the audio signal dependent time curve of the total information flow required for coding according to FIG. 15, with the information flow reserve being used essentially for dynamic error protection.

To exclude reductions in quality for these cases of application, the dynamic distribution of the information flow according to the invention is not effected solely in order to obtain maximum data reduction but also in order to obtain a so-called "mask-to-noise reserve." The mask-to-noise reserve fluctuates in dependence on the signal, approximately proportional to the information flow reserve, as shown in an exemplary manner in FIG. 15. If, for example, the useful signal is so narrow-banded that the information flow is set to zero in many sub-bands, the information flow is correspondingly increased (and so is resolution) for those sub-bands signals which produce masking. Such an increase is effected to the extent permitted by the information flow reserve. Therefore, the resolution of masking sub-band signals is significantly higher, under certain circumstances, than required by the masking threshold criterion.

The advantage of this form of dynamic distribution of the information flow to the sub-bands is that, for example, level sounds are transmitted with very high resolution (e.g. 16 to 18 bit linearly quantized). The transmission of a single spectral line with 16-bit resolution in a sub-band having a width of 500 Hz theoretically requires 16 kbit/s; however, because of the aliasing distortions to be considered (which will be discussed later, see FIG. 3) signal requires a bit flow that is approximately twice as large. Thus, depending on the frequency position, two or more spectral lines are transmitted simultaneously without any measurable reduction in quality if the system is based on sub-bands of a width of about 500 Hz and a bit flow in the multiplex signal of about 90 kbit/s. Significant functions of the sub-band transmission paths shown in FIGS. 1A and 2A can thus be easily monitored by measurements in that, for example, sinusoidal tones of any desired frequency and amplitude are transmitted.

The following applies for dynamic error protection:

Channel coding, i.e. error protection of the transcoded sample values in stage 7, and of the scale factors in stage 8, and the formation of the multiplex signal in stage 3 require an additional information flow. Accordingly, the information flow of the multiplex signal is composed of the information flows used for source and channel coding.

Figure 1B:
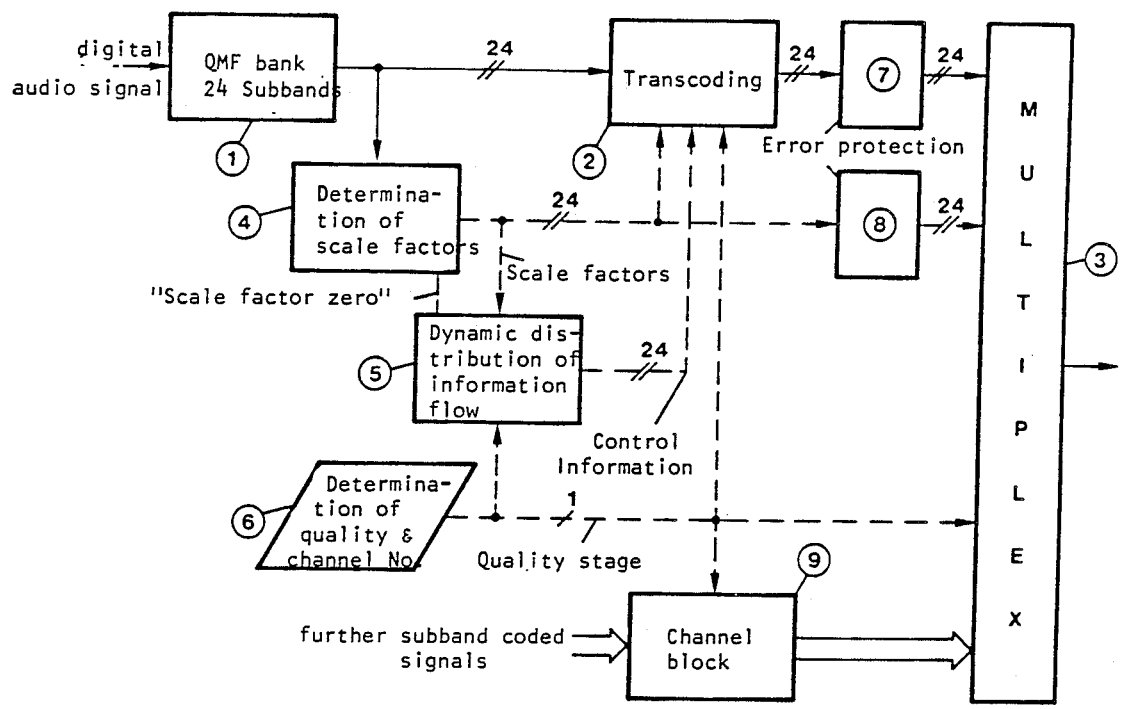
FIGS. 1B and 2B, block circuit diagrams similar to FIGS. 1A and 2A according to a second embodiment.

The dynamic information flow reserve available with a constant flow of information in the multiplex signal can be utilized for channel coding in such a manner that the degree of error protection for the multiplex signal is controlled as a function of the momentarily existing information flow reserve (dynamic error protection). The degree of error protection is advantageously controlled in steps. For example, FIG. 1B shows an information flow for dynamic error protection where the flow fluctuates in steps in dependence on the signal (region between the straight dashed line and the stepped curve). The information flow described by the stepped curve simultaneously represents the total information flow available for source coding; it is somewhat larger than the required total information flow.

Dynamic error protection leads to an increase in the average degree of error protection corresponding to the average available information flow reserve. Thus the probability of interference due to bit errors is reduced. The dynamic error protection further results in those audio signals which require a reduced total information flow being transmitted with a high degree of error protection and audio signals which require a high total information flow are transmitted with a lower degree of error protection. This error protection characteristic has a particularly advantageous influence because audio signals which require a small total information flow only weakly mask the noise signals caused by bit errors. These sensitive audio signals in particular are protected to a great degree. For example, for a voice signal, particularly during pauses in speech or during certain passages of music ("silence in the concert hall"), the required total information flow is particularly low and thus the degree of error protection is particularly high.

The degree of dynamic error protection is advisably configured in such a way that, with a given bit error rate, the subjective noise effect is approximately independent of the audio signal.

Quality Gradations

A further feature of the source coding method according to the invention is the possibility of determining the quality of source coding in stage 6 at the transmitter, (FIG. 1B). The criteria for quantizing the sub-band signals determined in stage 5, which will be described in greater detail below with reference to FIGS. 4 to 8, are evaluated with the aid of quality determination (stage 6). This is done as follows:

(a) The total information flow available for coding the audio signal is determined by the quality determination.

(b) The aspect of "increased signal to noise ratio" already described above for the dynamic distribution is evaluated. The "mask-to-noise reserve" is dimensioned as a function of the quality determination.

(c) The masking threshold criterion is configured, in dependence on the quality determination, such that certain critical useful signals, which require a large total information flow and occur rarely, contain perceptible but not annoying reductions in quality. For example, quality gradations are determined by the probability with which these reductions in quality occur.

(d) In dependence on the quality determination, a number of the sub-band signals are set to zero for critical useful, signals. This is done with priority for sub-band signals having a greater bandwidth and a greater information flow, respectively, and additionally on the basis of minimum noise effect. The relatively high noise effect with insufficient resolution of certain sub-band signals is avoided in that additional information flow is obtained in favor of these sub-band signals by setting to zero insignificant sub-band signals. Insignificant sub-band signals are those which, compared to other sub-band signals, have a lower level and make only an insignificant contribution to the perceptibility of the tone quality.

The significant factor is that a reduction of the total information flow is connected with a minimal reduction in quality because the dynamic distribution of the information flow to the sub-bands in stage 5 is effected not only on the basis of the available total information flow but also on the basis of quality stage specific criteria.

By way of a stepwise reduction in quality it is possible to transmit, instead of one useful signal, two or more useful signals simultaneously with the same information flow in the multiplex signal. Since the determination of quality in stage 6 determines the available total information flow for each useful signal, the quality gradation is selected in such a manner that selection of quality fixes the number of transmittable channels and vice versa. For this purpose, a channel block 9 (FIG. 1B) and the multiplex stage 3 are switched accordingly. The switching information is also transmitted in the multiplex signal so as to permit quality stage adaptive decoding at the receiver. Error protection for the switching information is provided in that this switching information is transmitted more frequently than necessary, for example at 100 ms intervals.

The following correlation is conceivable between quality stages and number of channels:

| Application | Quality Stage | Number of Channels | Bit Flow per Channel |
|---|---|---|---|
| storage, broadcast /studio | 1 | 1 | 200 kbit/s |
| storage, broadcast /standard | 2 | 2 | 100 kbit/s |
| broadcast/commentary | 3 | 3 | 65 kbit/s |
| broadcast/telephone | 4 | 6 | 33 kbit/s |

A reduction of the information flow per channel characteristically leads to a reduction in quality only for those useful signals which require a greater information flow even after irrelevance suppression and redundancy reduction than permitted, for example, according to the above table. The step-wise reduction of the information flow provided by the present invention is distinguished in that the probability for the occurrence of quality reducing signals is lower than in the prior art methods for the step-wise reduction of the flow of information. The probability of the occurrence of quality reducing speech signals, for example, equals zero for quality stages 1 to 3 of the table and is less than 100% for quality stage 4, with the degree of quality reduction lying considerably lower than for the bandwidth reduction customary for telephone signals.

Receiver

Figure 2A:
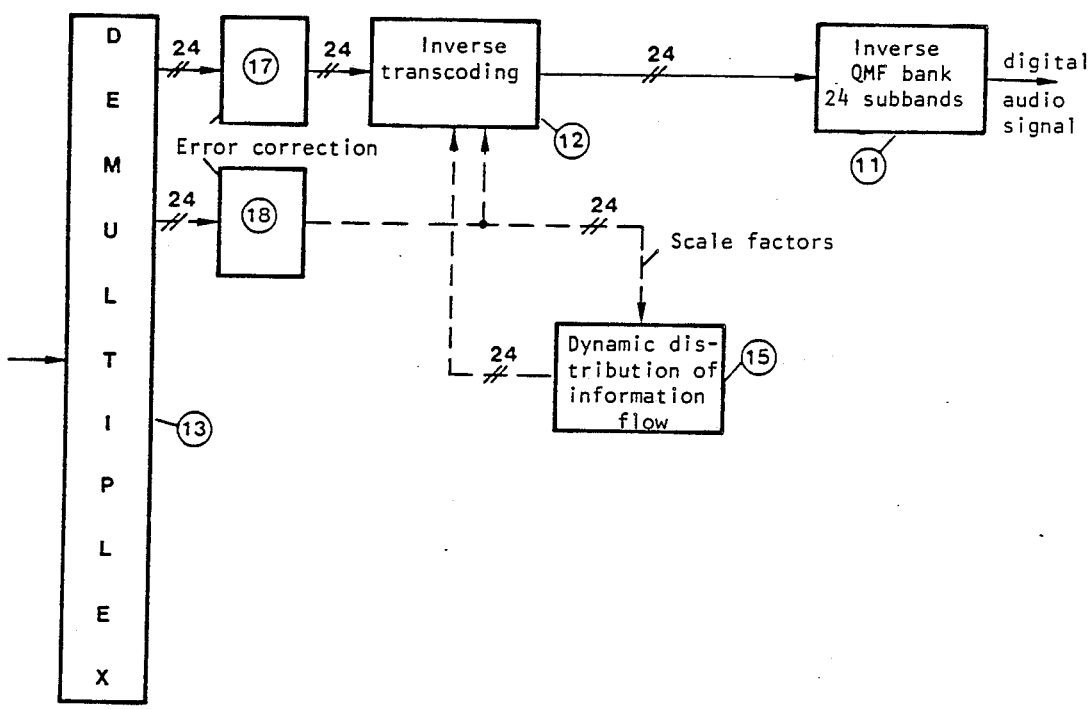

According to FIG. 2a, the error-protected transcoded sub-band signals, the associated error-protected scale factors and the information regarding the quality stage set at the transmitter are recovered at the receiver in demultiplexing stage 13. With the aid of the quality stage information, the number of alternative channels can be indicated in display 16 (FIG. 2B) so that by means of a channel selection switch 19 the listener can set the data to be emitted by demultiplexing stage 13. In stages 17 and 18, the error protection data for the transcoded sub-band signals and the scale factors are removed and error correction measures are taken. As at the transmitter, the scale factors serve as input information for stage 15 to control the distribution of the flow of information to the sub-bands. Stage 15 is therefore identical with stage 5 at the transmitter (see FIG. 3). On the basis of the control informations obtained in stage 15, the scale factors and the quality stage information, are transcoding inversely to stage 2 of the transmitter in stage 12 so that 16 to 18 bit linearly quantized sub-band signals are present at the inverse QMF filter bank 11 where the broadband digital audio signal can be recovered. Details regarding the configuration and operation of QMF filter bank 11 will be described in greater detail below with reference to FIG. 10.

Second Embodiment

Figure 1C:
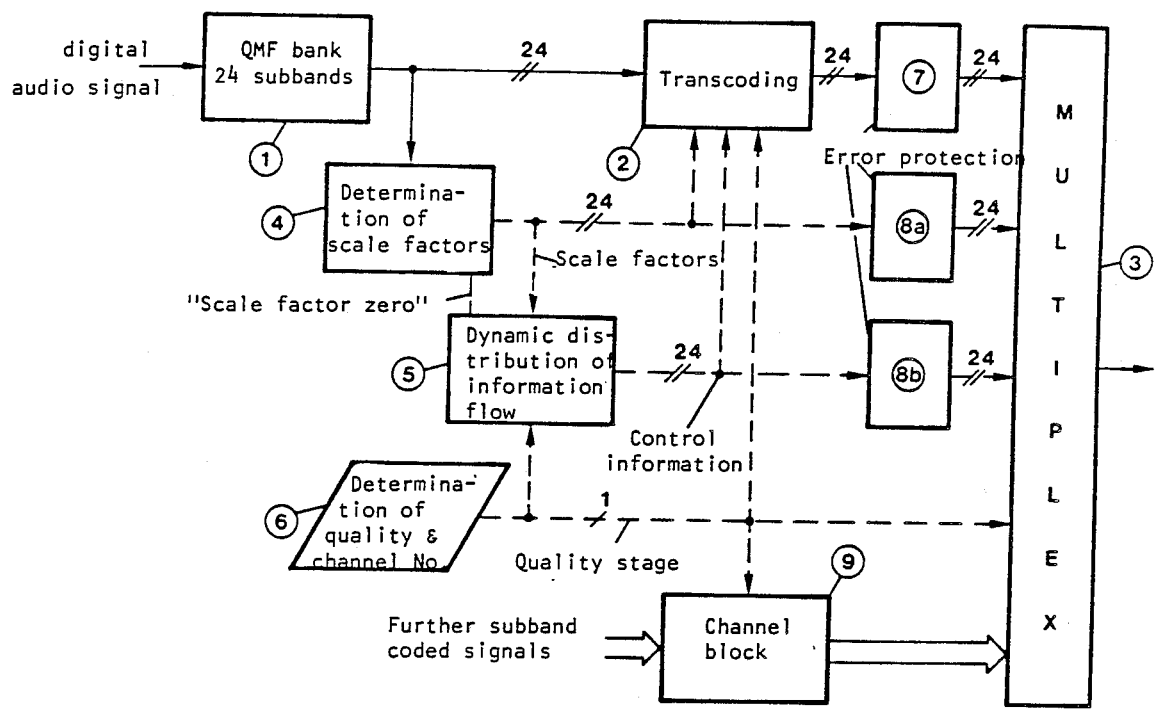
FIGS. 1C and 2C, block circuit diagrams similar to FIGS. 1B and 2B according to a third embodiment.
Figure 2B:
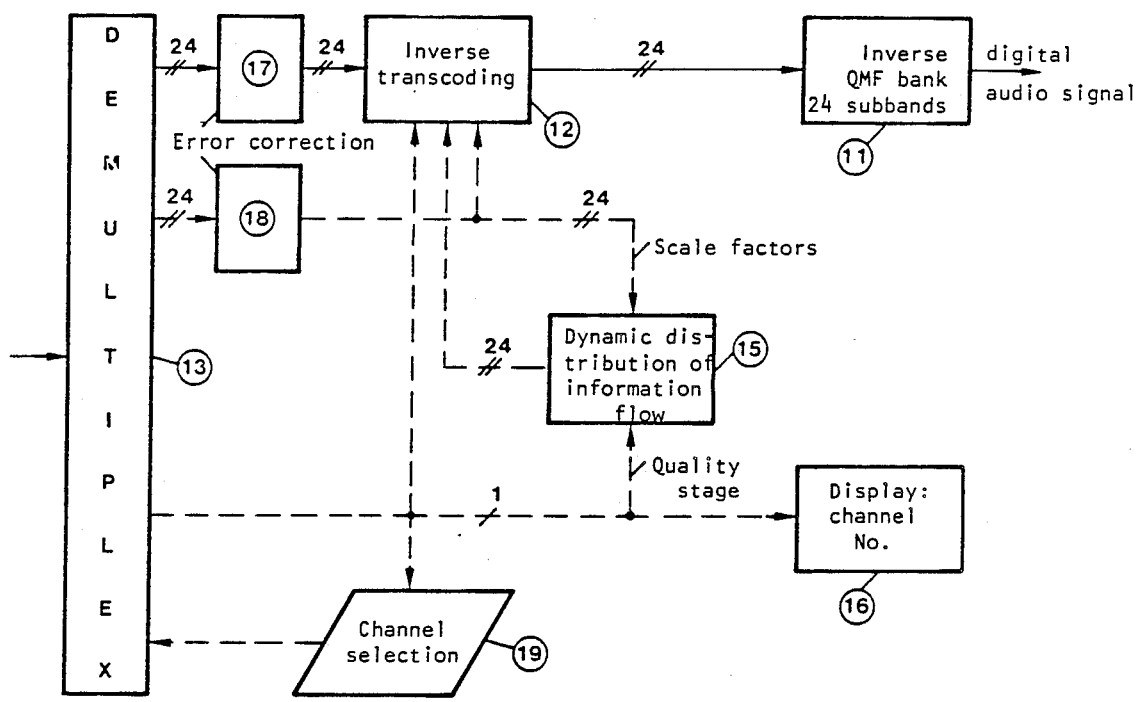
Figure 2C:
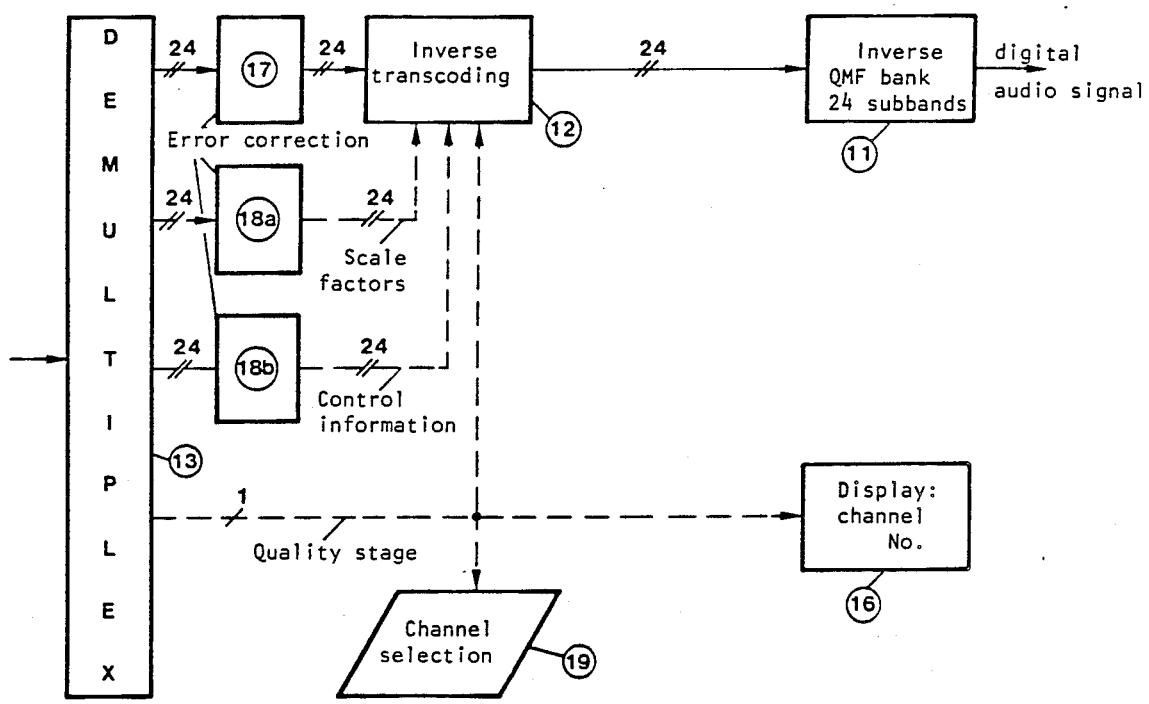

A further embodiment of the method according to the invention is shown in FIGS. 1C (transmitter) and 2C. (receiver). The coding according to FIG. 1C at the transmitter is identical with the above-described embodiment according to FIG. 1B. In deviation therefrom, in FIG. 1C the control information for the distribution of the information flow to the sub-bands is transmitted in the multiplex signal, with the control information being error protected in stage 8b. The effectiveness of this error protection is dimensioned similarly as that for the error protection of the scale factor in stage 8a. During the decoding at the receiver according to FIG. 2C, the control information, in deviation from FIG. 2B, is not newly determined on the basis of the scale factors (as this is the case in stage 15 according to FIG. 2B) but are obtained directly from the multiplex signal. In stages 18a and 18b, the error protection data for the scale factors and the control informations are removed and error correction measures are taken.

The second embodiment here under consideration, compared to the embodiment according to FIGS. 1B and 2B requires less engineering work at the receiver since the control information required for the inverse transcoding in stage 12 need not be newly determined. The additional information flow required for transmission and error protection of the control informations is approximately of the same magnitude as for the scale factor.

Further Embodiments

Further embodiments and advantageous features and modifications of the method according to the invention, particularly according to FIGS. 1D, 2D and 1E, will be described in the course of the description that follows.

DETAILS OF THE METHOD

Control of the Flow of Information

Figure 3:
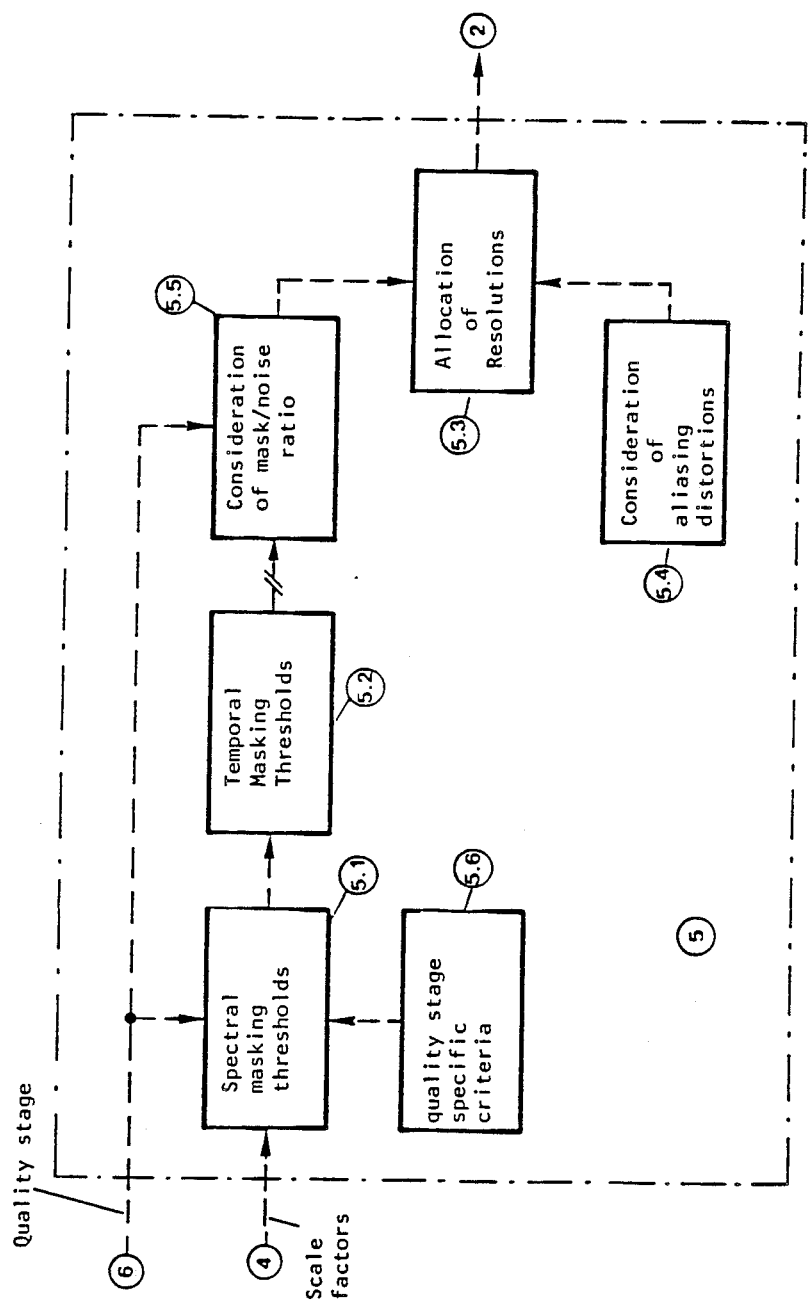
FIG. 3, a block circuit diagram for the steps provided in FIGS. 1A, 1B and 2A for the dynamic distribution of the information flow.

Stage 5, discussed in greater detail in connection with FIG. 3 for the derivation of the masking threshold criterion, includes a separate determination of the spectral masking thresholds in block 5.1 and of the temporal masking thresholds in block 5.2. This is done by considering the available total information flow through stage 5.5 and in dependence on quality stage specific criteria in stage 5.6. Stages 5.1, 5.2 and 5.5 are connected in series, with stage 5.1 being connected with the output of stage 4 and one control input of stage 5.5 is connected with stage 6. Moreover, a first control input of stage 5.1 is likewise connected with stage 6, while a second control input of stage 5.1 is fed by stage 5.6.

Since aliasing distortions occur in QMF filter bank 1 if adjacent sub-band signals are quantized very differently, a stage 5.4 gives a desired value with respect to the maximum permissible quantizing differences between adjacent sub-band signals to the extent that the aliasing distortions remain inaudible. For this purpose, stage 5.4 controls output stage 5.3 which is connected with the output of stage 5.5. In this way, output stage 5.3 serves to determine the distribution of quantizing by considering the given masking threshold by blocks 5.1 and 5.2, the available total information flow given by stage 5.5 and the aliasing distortion given by stage 5.4.

Masking Threshold Criterion

A static distribution of the quantization of the output signals within the individual sub-bands according to the prior art considers only the masking of the quantizing noise delimited within these sub-bands by the useful signal in the same band. Merely by considering, according to the prior art, the masking of the quantizing noise within the sub-bands, it is possible, according to Equation (1), with the selected division of the broadband signal [into] 24 sub-bands, to realize a reduction in the data rate by about 400 kbit/s compared to 16-bit linear PCM coding. In contrast thereto, the dynamic (signal-dependent) control of the quantization of the sub-band signals provided by the present invention makes it possible, on the one hand, to further reduce the data rate while retaining the same subjective quality and to produce an additional signal-specific quality reserve and, on the other hand, to realize a more extensive quality reserve without any reduction in the data rate.

Spectral Masking Thresholds

Figure 8:
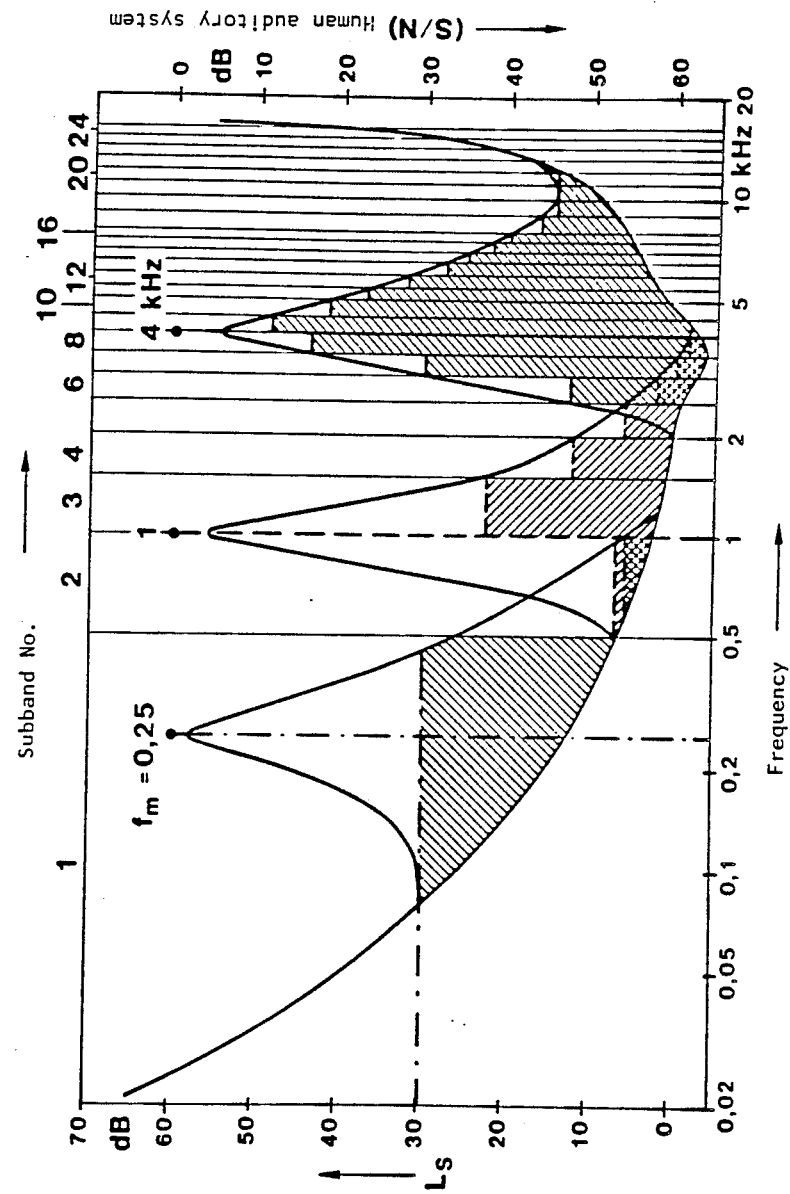
FIG. 8, a sub-band frequency scheme for an embodiment having a total of 24 sub-bands, with the masking threshold curves being plotted according to FIG. 4.

The control of the quantization provided by the present invention is performed according to the masking effect of a sub-band, signal having a high signal level on the adjacent sub-bands. If the sub-band scheme of FIG. 8 is employed, this masking effect can be utilized, essentially in a frequency range above 2 kHz, with sub-bands of the same absolute width of 500 Hz forming the basis in the range up to 8 kHz. In deviation therefrom, the frequency selectivity of the human auditory system and thus also the spectral masking relate to a constant relative bandwidth, the so-called frequency groups., The absolute constant bandwidths selected in the sub-band scheme according to FIG. 8 of the present invention approximately correspond to the width of the frequency group in the range from 2 to 4 kHz and are significantly narrower in the frequency range above 4 kHz than are the frequency groups of the human auditory system. Consequently, in this range the masking of adjacent sub-band signals can be expected to be greater, as shown schematically in FIG. 8.

Figure 4:
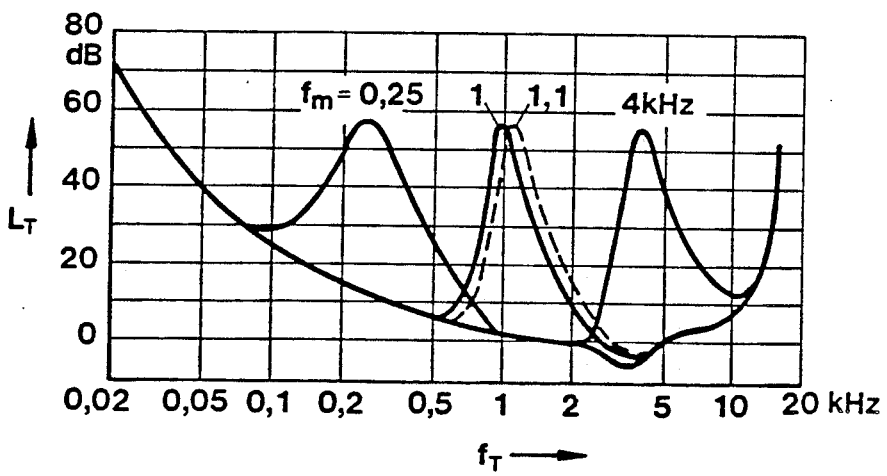
FIG. 4, examples of three different masking threshold curves which differ in the frequency position of the masking audio signal.

FIG. 4 shows the masking thresholds for noise of a width of the frequency groups and a center frequency of 250 Hz, 1 kHz and 4 kHz as the masking sound. In all three illustrated cases, the level of the masking noise is L=60 dB. The masking thresholds, plotted over a logarithmic frequency axis have approximately the same shape for the center frequencies of 1 kHz and 4 kHz. However, for a center frequency of 250 Hz, the curve is noticeably wider. Although the level of the interfering noise was selected to be constant, the difference between the maximum of the masking threshold is shown only in dashed lines from the 60 dB line (at 250 Hz only about 2 dB, while at 4 kHz the difference increases to 5 dB). Additionally, the masking thresholds at the lower edge rise quickly with about 100 dB/octave and drop significantly more slowly toward higher frequencies. This means that low loud tones primarily mask higher soft tones.

Figure 5:
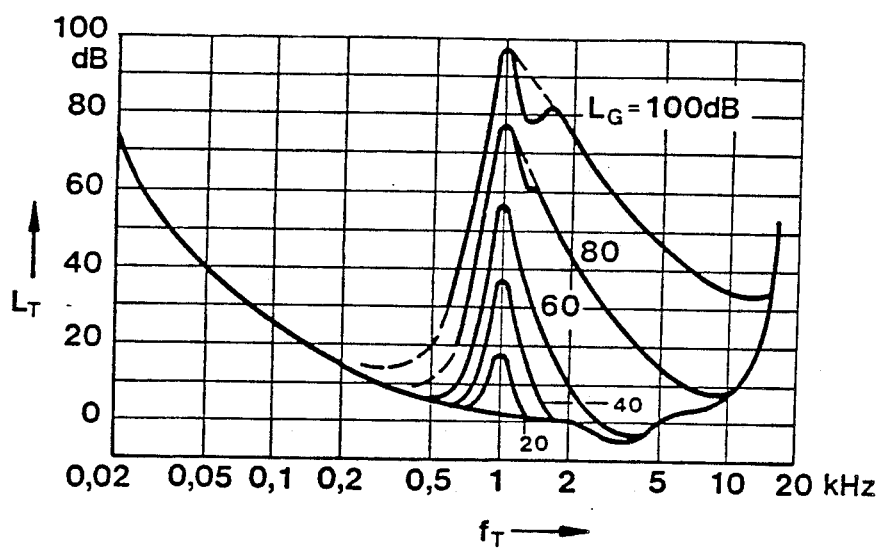
FIG. 5, the dependency of the middle masking threshold curve according to FIG. 4 upon five different levels of the masking audio signal.

The slope of the upper edge is a function of the level of the masking sound. This dependency is shown in FIG. 5. With low levels, the masking thresholds drop steeply toward higher frequencies, while with medium levels and, even more distinctly, with high levels, the drop becomes flatter. For a level of 70 dB, this drop is about 40 dB/octave. Thus, the frequency dependency of the masking threshold is additionally dependent upon the level of the interfering noise.

Figure 6:
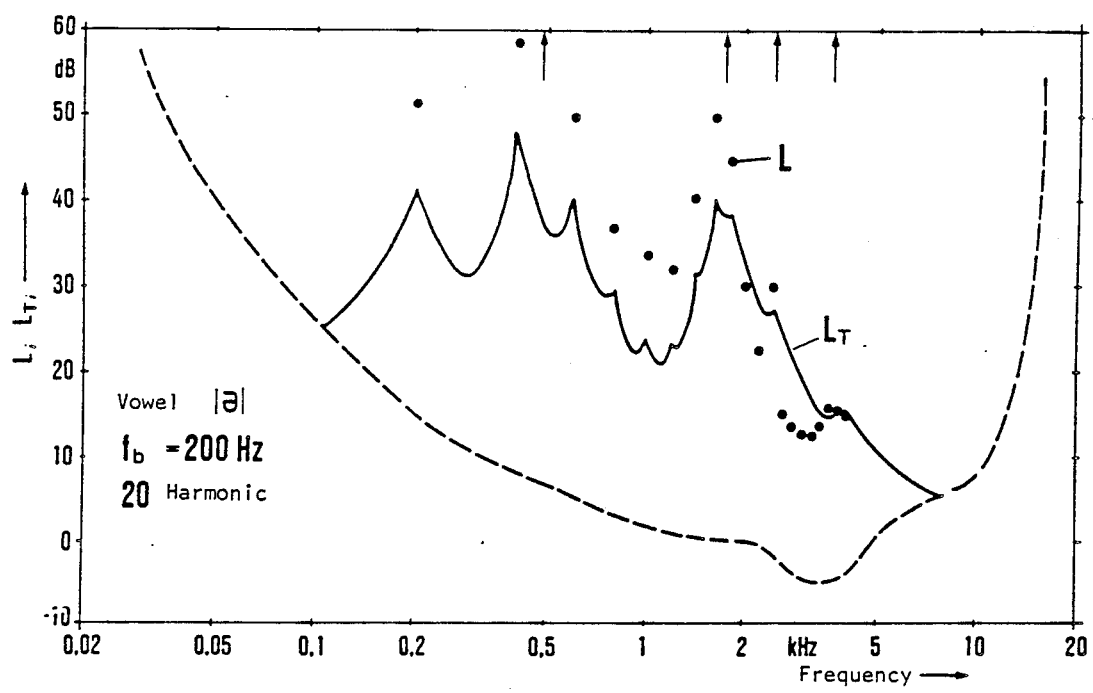
FIG. 6, a frequency diagram in which the harmonic for the vowel /∂/ is plotted in the form of dots as well ,as the resulting masking threshold drawn as a solid curve.
Figure 7:
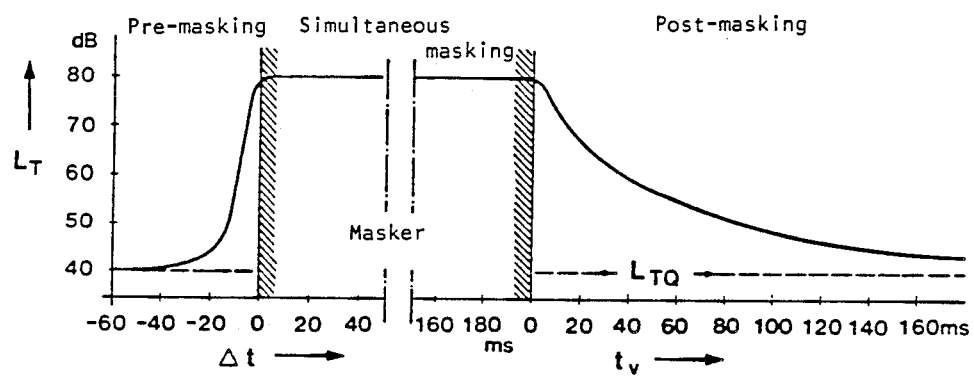
FIG. 7, a time diagram for the time curve of premasking, simultaneous masking and post-masking of the human auditory system.

Typically, the signals to be transmitted are composed not only of a single tone but of a plurality of harmonics (e.g. musical instrument, voiced speech sounds) or broadband noise (e.g. hissing sounds). Depending on the composition of the amplitudes of these harmonics, the masking thresholds produced by such signals are very different. For example, a trumpet having many harmonics produces much more broadbanded masking than a flute whose tone has a spectrum which is composed of almost a single line. FIG. 6 shows, for example, the masking thresholds for the vowel /ə/. The level of the individual harmonic is marked by the black dots, the resulting masking threshold by the solidly drawn line. In spite of partial mutual masking, the first nine harmonics are perceptible while the tenth and eleventh harmonic are masked primarily by the eighth harmonic. Harmonics Nos. 13 to 17, due to their weak levels, are masked by the relatively strong twelfth harmonic.

The spectral masking of any desired sound signal can be calculated in block 5.1 (FIG. 3) as follows (details of the calculation of masking thresholds are described in the publication by E. Terhardt, G. Stoll, M. Seewann, entitled "Algorithm for Extraction of Pitch and Pitch Salience from Complex Tonal Signals"; in J. Acoust. Soc. Am 71, 1982, pages 679–688).

$$L_{RHSi}(f_{ui}) = \{3.64 \, (f_{ui}/kHz)^{-0.8} - 6.5 \exp[-0.6 \, (f_{ui}/kHz \cdot 3.3)^2] + 10^{-3} \, (f_{ui}/kHz)^4\}[dB] \quad (3)$$

where $L_{RHSi}$ is the audibility threshold in quiet for the $i^{th}$ sub-band which is available in tabular form at the cutoff frequencies $f_{ui}$ of sub-band i.

The following applies for the tonality z as a measure for the frequency group of the human auditory system:

$$z = \{13 \text{ arc tan } [0.76 \, (f/kHz)] + 3.5 \text{ arc tan } (f/7.5 \text{ kHz})^2\}[\text{Bark}] \quad (4)$$

where z is likewise available in tabular form.

For the slope S of the lower edge of the masking threshold the following applies:

$$S = 27 \text{ dB/Bark} \quad (5)$$

For the slope S of the upper edge of the masking threshold the following applies:

$$S = [-24 - (0.23 \text{ kHz}/f_{oi}) + (0.2 \cdot L_i/dB)][dB/Bark] \quad (6)$$

where $f_{oi}$ is the upper cutoff frequency and $L_i$ is the signal level of the respective sub-band i.

The following applies for the stimulus distribution within sub-band i, which distribution forms the basis for spectral masking:

$$L_{Ek}(f_{ui}) = L_k - S(z_k - z_i) \quad (7)$$

Equation (7) describes the masking of a sub-band k over a sub-band i. The entire mutual masking from the various sub-band signals results from a summation of the amplitudes, of the stimulus distribution within the individual sub-bands. Masking of the signal level $L_i$ within sub-band i on the basis of the signals in the 23 other sub-bands is calculated as follows:

$$LX_i = L_i - 10 \lg \left[ \left( \sum_{\substack{k=1 \\ i \neq k}}^{24} 10^{L_{Ek}(f_{ui})/20 \text{ dB}} \right)^2 + 10^{L_{TH}(f_{ui})/10 \text{ dB}} \right] + 6 \text{ dB} \quad (8)$$

A sub-band signal having the signal level $L_i$ is completely masked if $LX_i < 0$ dB. Partial masking occurs if $$L_i > LX_i > 0 \text{ dB} \qquad (9)$$

Temporal Masking Thresholds

The distribution of quantizing to various sub-bands occurs not only in dependence on spectral but also on temporal masking. Three time regions for masking, shown in FIG. 7, can be distinguished. Pre-masking takes place in the time region before a masker has been switched on. If a masker and test sound are switched on at the same time, one speaks of simultaneous masking. After the masker is switched off, post-masking takes place.

The typical duration of pre-masking lies in a range from 10 ms to 20 ms. Rises in level must be fully reconstructed within this relatively short time.

For short test sound pulses, the simultaneous masking is dependent on the pulse duration T; for longer pulse durations, the masking threshold is independent of the duration. If the pulse duration is shortened (T<200 ms), the masking threshold rises with an increase of −10 dB/decade.

Post-masking extends to about 200 ms after the masker is switched off. The post-masking thresholds hold the value of the masking threshold within the first 5 ms after turn-off and, after 200 ms, reach the value of the audibility threshold in quiet. The effect of post-masking, due to its duration, plays a much more significant role than the effect of pre-masking. Post-masking is additionally dependent on the time during which the masker is switched on. If the masker is switched on for only a very short time (T<5 ms), the post-masking threshold drops to the value of the audibility threshold in quiet already after 20 ms.

Use of Masking Thresholds

Spectral and temporal masking characteristics are utilized in transcoder 2 at the transmitter, shown in FIG. 1a, to more finely quantize the signals of those sub-bands which are not masked or only slightly masked by adjacent sub-band signals than those signals which are masked very strongly and thus are hardly perceptible. Signals in sub-bands which are completely masked, i.e. lie below the resulting masking threshold, need not be transmitted. The signal of the respective sub-band can be set at zero. To be able to decode the transcoded signal in stage 12 of the receiver (FIG. 2a), the control information generated in stage 5 must be present at stage 12. To prevent co-transmission of this control information, the scale factors of the individual sub-bands are used as the input information for stage 5; these scale factors are transmitted in the multiplex signal in any case as secondary information. Thus, the inverse transcoder 12 at the receiver is able, solely on the basis of its knowledge of the scale factors of the individual sub-bands and by incorporating the same criteria for the resulting masking threshold as in stage 5 at the transmitter, to precisely associate the return quantization into the plane with linear quantizing (e.g. 16 to 18 bit resolution per sample value).

Consideration of Aliasing Distortions

Independently of the mutual masking of adjacent sub-bands, the discernibility of aliasing distortions must also be considered for the distribution of quantizing within the sub-bands. These distortions are created by the non-ideal bandpass filtering in the QMF filter bank 1 whose output signal is sampled at a rate which just corresponds to the minimum sampling rate of double the bandwidth possible for an ideal filter. However, because of the QMF filter structure of bank 1, the aliasing components convoluted into the transmission range of a filter of filter bank 1 are eliminated practically completely only if the signal has the same resolution in adjacent bandpass filters. In the selected sub-band scheme according to FIG. 8, aliasing distortions are critical with respect to their discernibility particularly in the range of the lower six sub-bands since the bandwidth of the quadrature mirror filters employed are greater than the width of a frequency group (see FIG. 8). In the range of high frequencies, aliasing distortions are far less critical since, due to the significantly narrower width of the respective sub-band quadrature mirror filter compared to the frequency groups, they are masked more strongly by the useful signal.

To avoid audibility of aliasing distortions, the heights of the quantizing stages in the lower sub-bands between adjacent bands must be selected to be as similar as possible while the upper sub-bands may have greater differences in the heights of their quantizing stages between adjacent sub-band.

Buffer Memories

To additionally reduce the information flow, buffer memories are required in the transmitter and in the receiver in transcoders 2 and 12 for the individual sub-band signals, as will be described in greater detail below with reference to FIG. 11. Such buffer memories make it possible to delay the signals for a time which approximately corresponds to the post-masking thresholds of the human auditory system.

A delay in the audio signal by a value between 200 ms and 500 ms, on the one hand, is optimally adapted to the temporal masking thresholds of the human auditory system and, on the other hand, is well justified for use in practice. This signal delay is necessary to ensure efficient distribution of the information flow not only to the various sub-band signals but also to the respective time blocks for which scale factors have been determined. A distribution of the information flow which varies within a time window gains in significance particularly under consideration of the temporal masking thresholds. For example, fast increases in level of the sub-band signals can be transcoded very accurately, fast drops in level which, due to the relatively slowly dropping post-masking thresholds, are marked strongly can be transcoded with sufficient accuracy. The time distribution of quantizing is here effected, as is the spectral distribution to the individual sub-bands, on the basis of the masking threshold criterion, with a consideration being made in stage 5.5 of FIG. 3, to maintain a minimum "mask-to-noise" ratio. This can be realized, for example, in that the buffer memory feeds a control signal containing information about the charge state of the buffer memory to stage 5.5.

Error Protection for the Transcoded Sub-band Signals

The protection of the sample values against transmission errors taking place in stage 7 (FIG. 1A) can be simplified considerably for the following reasons.

Interference effects of faulty received sample values do not extend to the entire audio bandwidth, but are limited to the width of the associated sub-band. The maximum amplitude of the interference in the respective sub-band is limited in magnitude by the transmission of a scale factor. This means that the spectral distribution of faulty received sample values roughly approaches the spectral structure of the useful signal and thus produces the greatest possible masking of interference caused by transmission errors in sample values.

Figure 9:
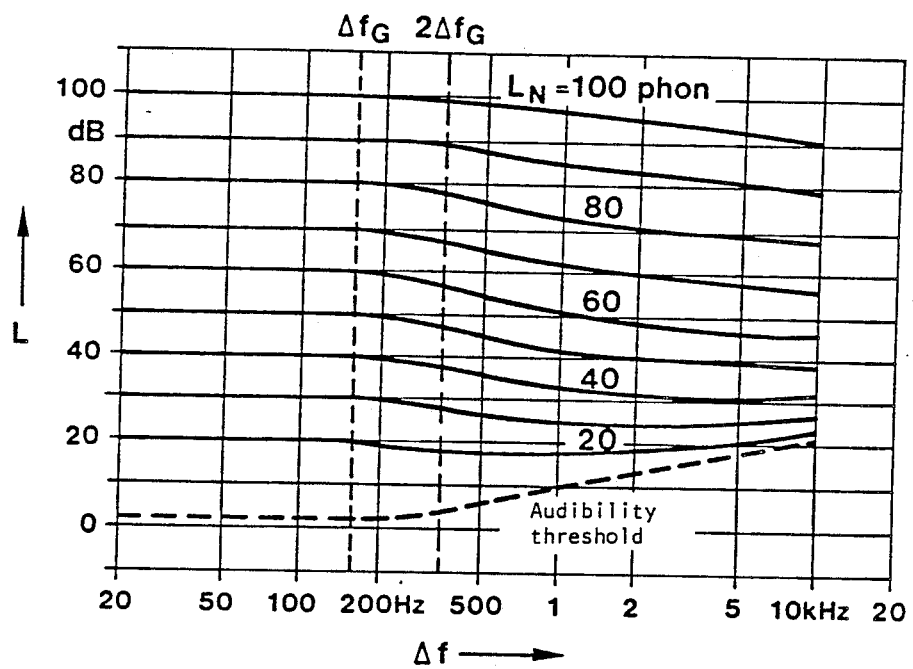
FIG. 9, identical volume curves for narrowband noise as a function of bandwidth.

Since, with bandpass limited noise at a constant level, its loudness depends on the bandwidth, it is advisable, to give priority to the avoidance of interference in sub-bands of bandwidths which are greater than the frequency groups of the human auditory system over interferences in narrower sub-bands. Noise having a bandwidth of more than 2 frequency groups produces the same loudness sensation, with an average noise pressure level, as a noise raised in level by 3 dB but having only the width of the frequency groups (see FIG. 9). In order to give interferences a minimum influence on loudness, the noise spectrum should be reduced to the width of one frequency group. Since in the present sub-band scheme (FIG. 8) the bandwidth sometimes substantially exceeds the width of the frequency groups in the five lowermost sub-bands (the first sub-band extends over a total of five frequency groups), the sample values of the two lowermost sub-bands must be protected intensively and those of the third to fifth sub-bands must be protected sufficiently.

Quadrature Mirror Filtering in Stages 1 and 11

Figure 10:
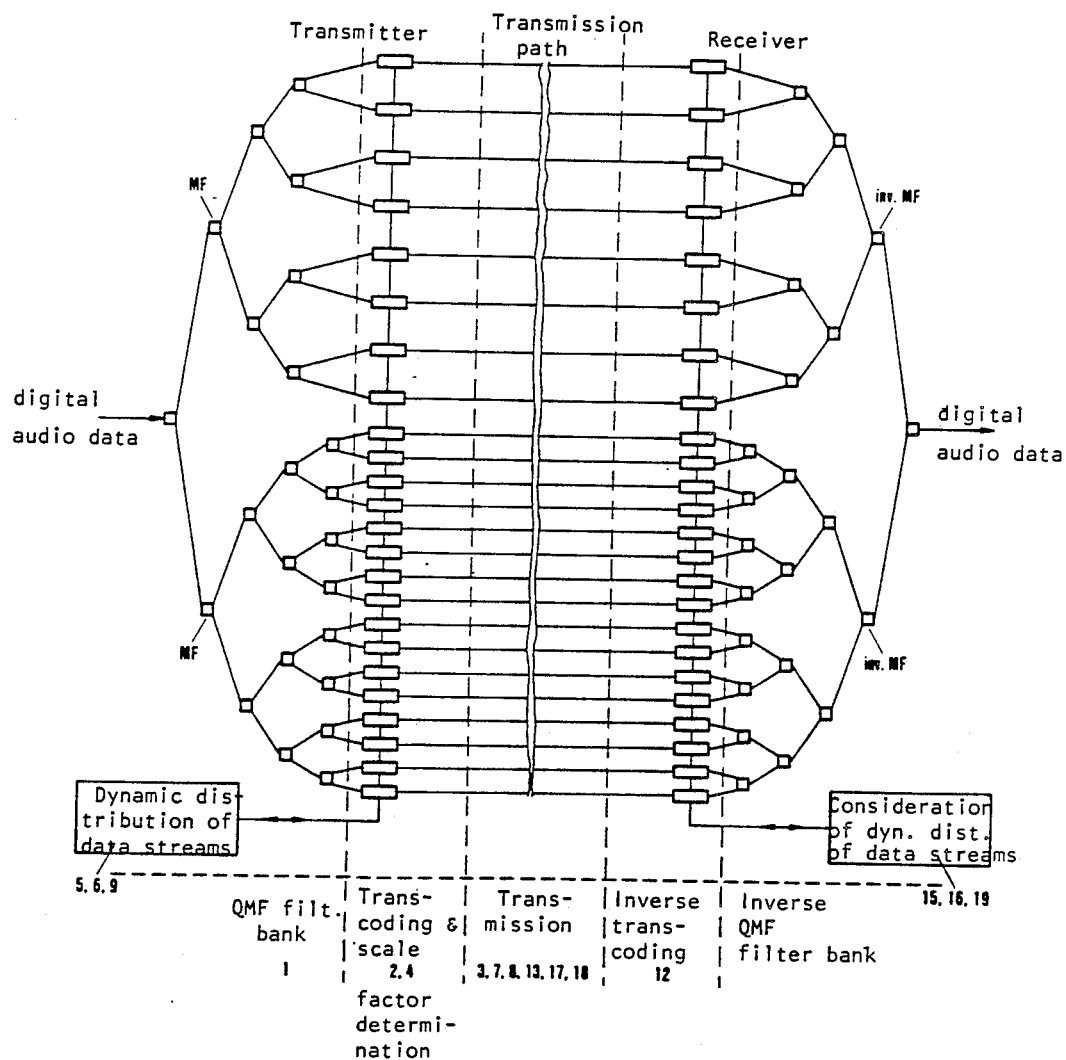
FIG. 10 the structural configuration of QMF filter banks at the transmitter and receiver according to FIGS. 1A and 2A and 1B and 2B, respectively.

The processing steps at the transmitter and receiver shown in FIGS. 1A and 2A are illustrated by means of the function scheme of FIG. 10.

QMF filter bank 1 which is fed with the digital audio signal is composed of a cascade of mirror filters MF which successively subdivide the audio signal spectrum, in the illustrated exemplary case into 24 sub-band signals. Each mirror filter MF constitutes a so-called "finite impulse response" (FIR) filter which divides a digital input signal into two sub-bands that lie in mirror symmetry to the cutoff frequency. To do this, the cutoff frequency of the equivalent lowpass filter is selected in such a manner that it corresponds to one-half the bandwidth of the input signal.

The slope of the edges of the lowpass filter characteristic is proportional to the number of coefficients of the FIR lowpass filter. The calculation of the coefficients is described in the publication by Chrochiere and Rabiner, entitled "Multirate Digital Signal Processing", published by Prentice Hall, Englewood Cliffs, N.J., U.S.A. Each mirror filter MF divides its input signal into two identically sized sub-bands and thus cuts its sampling rate in half so that the quantity of information passing through the filter remains unchanged in principle. Only the word length of 20 to 23 bits of the sample values transferred between the cascaded filters MF is somewhat greater than that of the input signal which usually has a length of 16 to 18 bits so as to eliminate rounding errors due to the cascade connection. A frequency distribution to 24 bands at a sampling rate of 32 kHz is effected by dividing the 0 to 8 kHz range into 16 bands of 500 Hz each and the range from 8 to 16 kHz into 8 bands of 1 kHz each (see FIG. 8). To do this, 5 or 4, respectively, cascaded filters MF are required. The unavoidable aliasing distortions as a result of the not infinitely steep edges of the equivalent lowpass filter characteristic of mirror filters MF are compensated during back filtering if quantizing is identical in adjacent sub-bands.

Cascading always optimally utilizes the quality of the filter bank since with the same number of coefficients the length in time of the FIR lowpass filter and thus the slope per Hertz increases in later cascade stages. Sixty-four coefficients per filter are sufficient for filtering since it has been found that the slope of the filter edges need not be greater than the maximum slope of the masking threshold curve.

If the same set of coefficients is employed in each filter stage, the filter slope becomes greater the lower the sampling rate has become due to preceding spectral divisions. In the later filter cascades this slope is not absolutely necessary since it is not realized at all band limits. If, in the later filter cascades, one therefore employs filters having fewer coefficients, primarily the signal delay time is reduced which is of significance in real time applications such as, for example, for a radio broadcast. To obtain the edge slope required for the human auditory system, 16 filter coefficients are sufficient in the last filter cascade.

Real filters have a residual ripple which, although it has no noticeable effect on the frequency response (residual ripple $\leq 0.002$ dB), may lead to still audible "filter ringing" with pulses lasting a very short time. These are secondary pulses which are generated 10 ms to 100 ms before and after the primary pulse and have a level of about $-80$ dB compared to the useful signal. To avoid such signal errors which, under certain circumstances, may be audible, the signal is subjected, before the actual coding, to forward and inverse filtering but not to data reduction. The error signal produced by this forward and inverse filtering is extracted and inversely added to the original signal to be coded. The interfering properties of the filters in the coder and decoder are thus sufficiently suppressed.

Transcoding and Determination of the Scale Factors in Stages 2 and 4

In transcoding stage 2 the resolution of the incoming sub-band signals is reduced from 16 (18) bits down to 1.5 bits per sample value. This means a reduction in the number of stages of the sample values in each sub-band. To do this, the magnitude of the maximum, sample value is initially located for each sub-band from a certain number of timely successive sample values (=block) and this magnitude is then associated with a classification scheme. This scheme is composed of 64 classes each corresponding to 6 bits which subdivide the dynamic range of a 16-bit PCM (96 dB) into 96/64 dB=1.5 dB per stage. The stage number corresponding to the maximum sample value represents the scale factor for the sequence of sample values under consideration. The scale factor determined in stage 4 is fed to transcoding stage 2 which additionally receives from stage 5 information about the number of quantizing stages required for each block (based on the masking criterion employed there) and from stage 6 further information about the desired quality of source coding.

Figure 11:
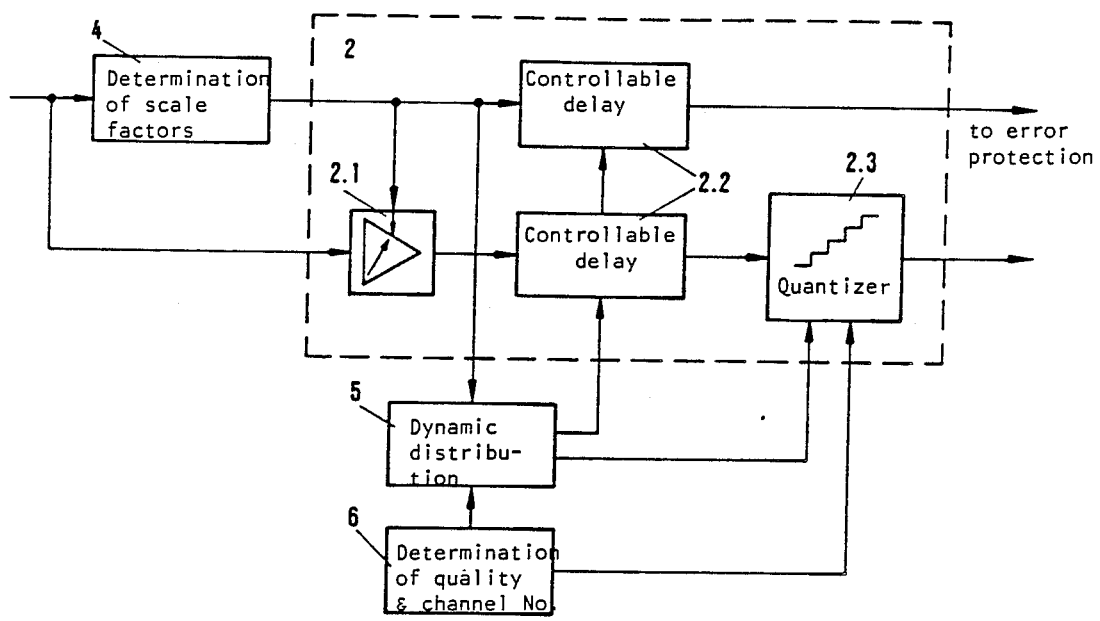
FIG. 11, a block circuit diagram of the transcoding stage according to FIGS. 1A and 2B.

As can be seen in detail in FIG. 11, stage 2 includes a controllable amplifier 2.1 for the linearly quantized sub-band signals, the amplifier being controlled by the scale factor from stage 4. The amplified sub-band signals pass through a controllable delay member 2.2 which is required for the consideration of the temporal masking thresholds (see section entitled "Buffer Memories"). The amplified and delayed sub-band signals are requantized in quantizer 2.3 under control of stages 5 and 6.

The region in the positive and negative direction represented by the scale factor is subdivided by the respectively given number of quantizing stages. The result is that the height of the steps is less for small scale factors corresponding to small value ranges and thus the resolution is higher than vice versa for large scale factors corresponding to large value ranges. By subdividing the broadband useful signal into sub-band signals, it is therefore possible to give higher resolution to individual spectral components having a low level than is possible with an overall quantization of the broadband useful signal in which such low-level spectral components are resolved with the same limited accuracy as the spectral components having a high level.

To be able, on the one hand, to follow increases in level in view of the relatively short pre-masking of the human auditory system and, on the other hand, not be forced to transmit the scale factor too frequently, the scale factor is formed, for example, for every four sample values but only every other scale factor is transmitted. In order to be able to reconstruct the not-transmitted scale factors in the receiver, an information bit is transmitted for the group-of-four blocks associated with the omitted scale factors and this information bit indicates the validity of the preceding or subsequent scale factor for the scaling of the respective group-of-four block. These relationships are described and schematically illustrated in FIGS. 12 and 13.

Figure 12:
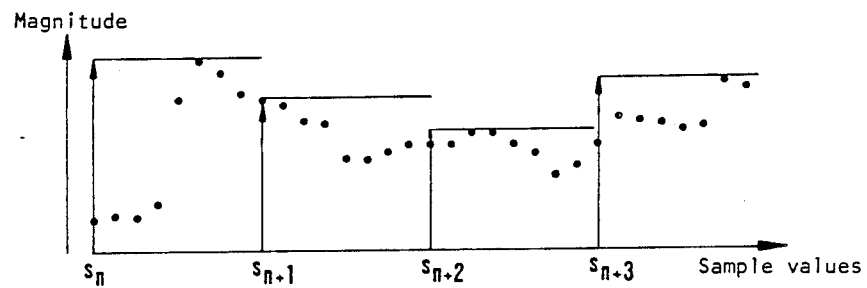
FIG. 12, a schematic representation for the determination of a scale factor for the eight sample values of a digitalized audio signal.
Figure 13:
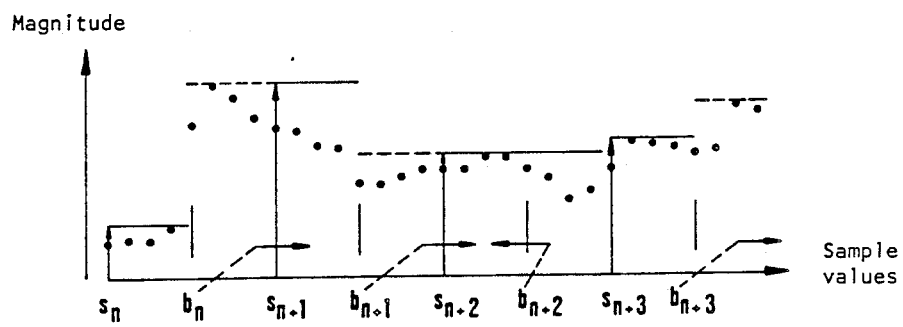
FIG. 13, a schematic representation similar to that of FIG. 12 but with only every other scale factor being used for transmission purposes and the not transmitted scale factors being reconstructed with the aid of so-called association bits which indicate whether the respective not transmitted scale factor is associated with the preceding or subsequently transmitted scale factor.

FIG. 12 shows the formation of the scale factor for a level curve involving blocks of 8 sample values each; FIG. 13 shows the same level curve for blocks of 4 sample values each, with only every other scale factor of 6 bits being transmitted and an additional information bit being employed so that instead of 6 bit/8 sample values, 7 bit/8 sample values are now being transmitted. As shown in FIG. 13, the increase in level occurring between scale factors $S_n$ and $S_{n+1}$ is detected more accurately in time than in the case of FIG. 12. The inevitably stronger quantizing noise in FIG. 12 (high value of $S_n$) for the first four sample values belonging to scale factor $S_n$, turns out to be less due to the lower scale factor in FIG. 13 with correspondingly finer quantizing stages. Even for level peaks which are very short in time (within a time span of less than 4 sample values), the rise in level is better approximated in time with the aid of the additional information bit (FIG. 13), with the associated drop in level being less important due to the significantly longer post-masking of the human auditory system so that even longer "noise trails" can be tolerated.

Scale factor and additional information bits are generated in each sub-band as follows, with it being assumed, for better understanding, that only the scale factors having an even numbered index, $S_{2n}$, $S_{2n+2}$, ... are being transmitted.

| | |
|---|---|
| $S_{2n} < S_{2n+1} < S_{2n+2}$ | closest level value |
| $S_{2n} < S_{2n+1} > S_{2n+2}$ | $S_{2n+2}$ from $S_{2n+1}$ |
| $S_{2n} > S_{2n+1} > S_{2n+2}$ | closest level value |
| $S_{2n} > S_{2n+1} < S_{2n+2}$ | $S_{2n+1}$ from $S_{2n}$ |

To make the rigid classification scheme for the scale factor finer in the 1.5 dB stages, the transmission of an additional information is provided which minimizes the error produced by this classification. A 3-bit additional information is provided every 8 sample values in frequency ranges from 1.5 to 3.5 kHz and from 3.5 to 8 kHz; according to FIG. 8, this additional information indicates the total deviation from the 1.5 dB raster in ($\frac{1}{8}$)·1.5 dB steps for all of the sub-bands covering these two frequency ranges. This is for the benefit, for example, of individual tones whose changes in level can be transmitted with an accuracy of about 0.2 dB.

The selection of this fine raster should be made on the basis of a minimum quadratic error so that only the strongly modulated sub-bands determine the fine raster. Therefore, the additional information is not applicable for all sub-bands, for the following reason: in the selected sub-band scheme according to FIG. 8, the bandwidth of the three lower sub-bands up to 1.5 kHz is substantially greater than the bandwidth of the frequency groups of the human auditory system so that masking within these three sub-bands is relatively low. Therefore, these three sub-bands require a relatively high resolution, for example, of 10.6 bit/sample value for the sub-band from 0.5 to 1 kHz. Due to the relatively high resolution for these sub-bands, the disadvantages of classification become insignificant for the scale factor below 1 kHz. Above 8 kHz, the 1.5 dB classification is felt to be sufficient.

A further characteristic of transcoding stage 2 is that a scale factor of magnitude zero is processed so that for all reduced sample value informations the respective block of the respective sub-band signal is not transmitted. The same applies if stage 5 notes that in a particular sub-band the scale factor lies below the respective masking threshold (mutual masking), whereupon stage 5 sends a control instruction to stage 4 to "set the scale factor to zero".

Moreover, stage 4 may include, a noise block which can be switched in for each sub-band to suppress empty channel noise, inaccuracies during the A/D conversion and the like. In this connection it is conceivable to provide adjustable thresholds.

In the quantization of stage 2 an odd number of quantizing stages must be provided in order to prevent values near zero from constantly changing between two quantizing stages. Otherwise components could result which lie far above the signal level of the sub-band. Not all stage numbers can be converted directly to digital values without giving away displayable values and thus transmission capacity. For example, for the display of three possible stages, 2 bits of information would have to be used; the fourth possible combination of these two bits, however, would remain unused and would here mean the expenditure of 33% more information.

Such losses in transmission capacity can be minimized in that a plurality of sample values are coded together into one data word. For example, five sample values each having three stages provide $243 = 3^5$ possible combinations which can be transmitted with 8 bits, i.e. 256 states, with less irrelevance and little coding expense.

Additional Spectral Analysis to Obtain the Control Information

Figure 1D:
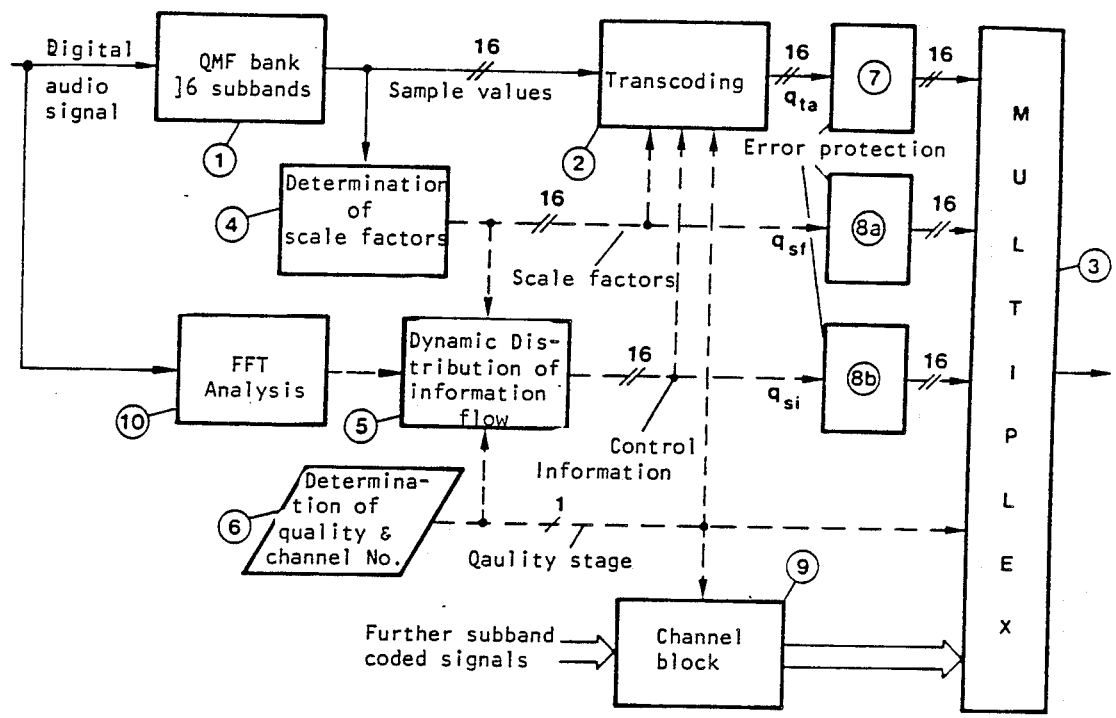
FIGS. 1D and 2D, block circuit diagrams similar to FIGS. 1C and 2C according to a fourth embodiment with additional spectral analysis (FFT) at the transmitter.
Figure 2D:
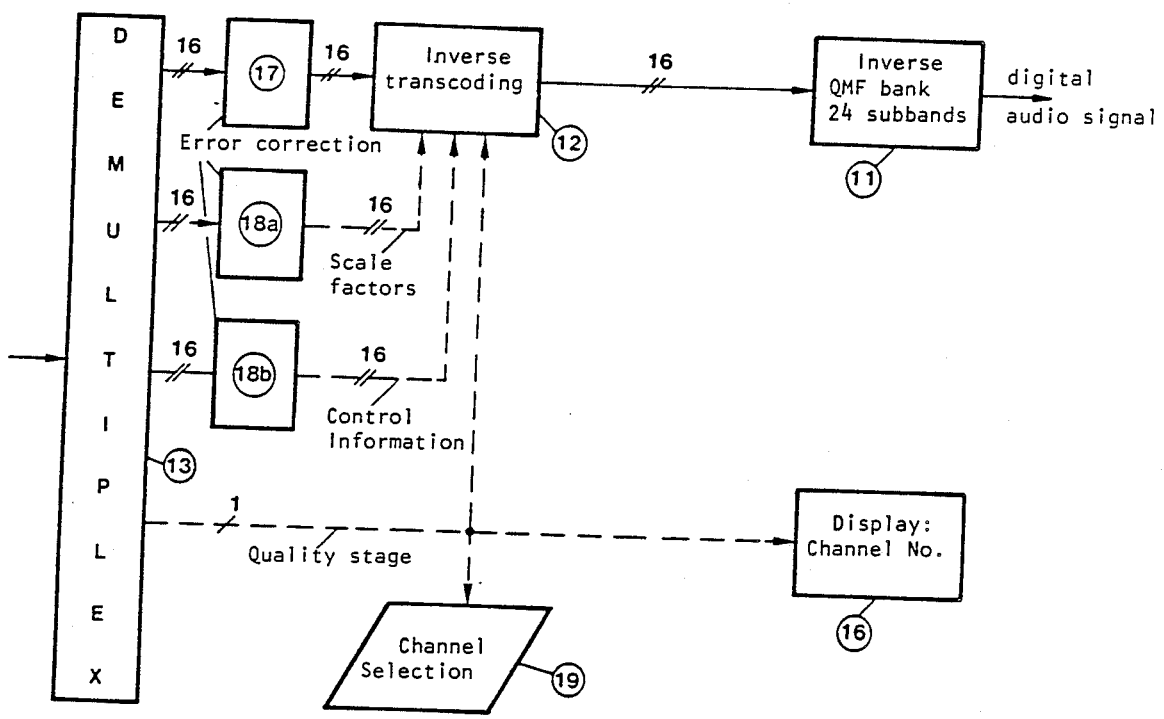

Another embodiment of the method according to the invention is shown in FIGS. 1D (transmitter) and 2D (receiver). A significant portion of the control information for the quantization of the sample values is obtained from the spectral curve of the audio signal. To obtain this information, the audio signal is subjected to a Fourier subdivision at the transmitter which can be realized, for example, by means of a fast Fourier transformation. This Fourier transformation produces essentially the following advantages:

more precise spectral representation compared to a bandpass subdivision of the audio signal;

the tonal components can be distinguished from the more noise-like components of an audio signal;

the more precise spectral analysis and differentiation between tonal and noise-like components permits a more effective determination of the masking thresholds compared to the case in which the control variables are obtained only on the basis of a limited number of sub-band signals;

reduction of the amount of hardware required at the receiver with simultaneously shorter delays in the audio signal transmission and the same transmission rate for the multiplex signal as without this additional measure.

The reduction in required hardware is caused by the fact that fewer bandpass filters need be employed. The lower number of bandpass filters primarily means less processor expenditures which has a positive effect particularly in, the development of a cost-effective receiver. Broader sub-bands permit a shorter total delay in the system. FIGS. 1D and 2D reflect the reduction in hardware expenditures insofar as instead of the 24 sub-bands in the previous embodiment only 16 sub-bands are employed. The principally greater data flow of transcoded sub-band signals as a result of the broader sub-bands can be approximately compensated again by a more precise determination of the masking thresholds.

Sufficient spectral resolution in the range of lower frequencies of the audio signal would be possible by a spectral representation of adjacent supporting values of about $\Delta f = 10$ Hz. Since the decisive advantage of a precise spectral determination is given for the determination of the simultaneous audibility thresholds (22 of the total of 24 frequency groups of the human auditory system lie in a frequency range up to 10 kHz), a spectral analysis up to about 10 kHz is sufficient. If the amplitude spectrum is spectrally represented by 512 real supporting values, this results in a spacing of $\Delta f = 20$ Hz between adjacent supporting values. A more precise frequency determination is possible on the basis of an evaluation of adjacent frequency support points by means of suitable interpolation algorithms.

In addition to the control variables from the FFT analysis (stage 10) the input values of the block for dynamic distribution of the information flow (see FIG. 1D) also include control variables for a determination of quality and channel number and the scale factors of the individual sub-bands. By comparing the control variables on the basis of the FFT analysis and the scale factors, aliasing distortions, which are no longer fully compensated at the receiver by the differences in quantization in the sub-band signals, can be considered with sufficient accuracy during the dynamic distribution of the flow of information.

Stepwise Data Reduction

In various applications of the method according to the invention, it is advantageous to reduce the data of the audio signals in steps. For example, for the transmission of high-quality audio signals between two studios, data reduction must be effected in such a manner that a sufficient "mask-to-noise" reserve is ensured to permit subsequent processing without loss of quality (studio quality, see sections entitled "Utilization of the Fluctuating Information Flow: Increased Signal to Noise Ratio" and "Quality Gradations"). No increased signal to noise ratio is necessary for further distribution and/or storage so that the audio signals coded for studio quality may be subjected to a more extensive data reduction.

An advantageous feature of the method according to the invention is that the various quality gradations of the audio signals coded according to the invention are "downward compatible", i.e., for example, a 192 kbit/s multiplex signal can be converted into a 128 kbit/s multiplex signal with the aid of a special transcoder, with the 192 kbit/s coding ensuring an increased signal to noise ratio (further processing is possible) and the 128 kbit/s coding providing for a smaller signal to noise ratio and a higher degree of error protection.

Figure 1E:
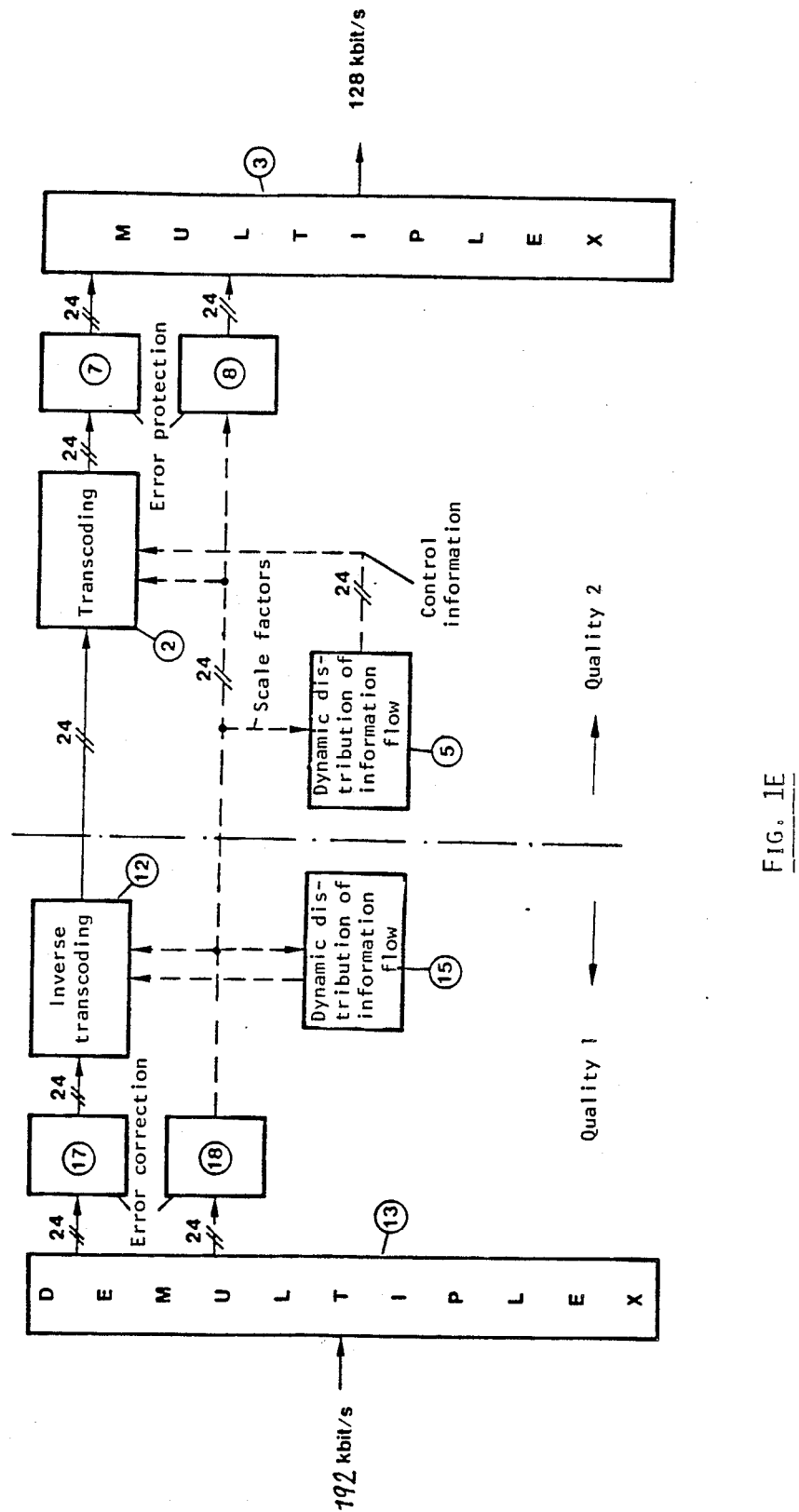
FIG. 1E, a block circuit diagram for the implementation of a step-wise data reduction according to the first embodiment of the method according to the invention.

FIG. 1E shows an embodiment of such a transcoder. It is composed of stages 12, 13, 15, 17, and 18 of the decoder of FIG. 2A and of stages 2, 3, 5, 7, and 8 of FIG. 1A. It is characterized in that the 192 kbit/s coded audio signal is not completely recovered and recoded but that the secondary information (scale factors) obtained from the original signal forms the basis of the new coding in the right-hand portion of the transcoder (stages 2, 3, 5, 7 and 8). Thus a reduction of the signal to noise ratio due to cascading is avoided. Since inverse filtering and forward filtering (stages 11 and 1 in FIGS. 2A and 1A, respectively) are omitted, the delay caused by the transcoder according to FIG. 1E is short (about 4 ms).

What is claimed is:

1. In a method of transmitting or storing digitalized audio signals having spectral and temporal structure, wherein each audio signal is represented by a plurality of spectral, quantized components, the method comprising the steps of: producing the plurality of spectral, quantized components from the digitalized audio signal, with each component having respective level values associated with the spectral and temporal structure of the audio signal; obtaining masking thresholds corresponding to the human auditory system for each component; changing the quantizing of the individual components on the basis of the respective masking thresholds of the human auditory system to produce coded components, thereby reducing the magnitude of a total information flow required for the transmission or storage of all coded components which fluctuates in dependence on the spectral and temporal structure of the audio signal; transmitting or storing the coded components; decoding the transmitted or stored coded components; and reconstructing a broadband, digital audio signal from the decoded components;

the improvement wherein the step of changing the quantizing of the components is on the basis of the level values of each component so that the quantizing noise levels of the individual components have approximately the same level difference from the respective masking threshold of the individual components, the differences of the quantizing noise levels of the components being set by the difference between the required total information flow and the total information flow available for coding.

2. In a method of transmitting or storing digitalized audio signals represented by a plurality of spectral, quantized components, the method comprising the steps of:

(a) determining level values of each said quantized component of said digitalized audio signal;

(b) obtaining masking thresholds based on the human auditory system and the determined level values of said individual components;

(c) changing the quantizing of said components on the basis of said masking thresholds of the human auditory system to produce coded components;

(d) transmitting or storing said coded components;
(e) decoding the transmitted or stored coded components; and
(f) reconstructing a broadband, digital audio signal from the decoded components;
the improvement wherein said step of changing the quantizing of said components is made such that quantizing noise levels of the individual components produced during the quantizing of an audio signal to provide the digitalized audio signal have approximately an equal level difference from the respective masking thresholds of the individual components, and
said approximately equal level differences are set by the difference between (i) a total information flow required for the transmission or storage of said coded components, and (ii) a total information flow available for coding.

3. Method according to claim 2, wherein the magnitude of the available total information flow is variable, with respect to the required total information flow.

4. Method according to claim 2, wherein the quantizing noise levels of the components lie below said masking thresholds.

5. Method according to claim 2, wherein the step of changing the quantizing further comprises a spectral analysis of the audio signal to determine components which only slightly influence tonality of the audio signal, and the level values of the determined components which lie above the resulting masking threshold are set to zero if the quantizing noise levels of the components lie above said masking thresholds.

6. Method according to claim 5, wherein only so many components are set to zero as are necessary to reduce the quantizing noise level of the components to the extent that said level lies just below the said masking thresholds.

7. Method according to claim 2, wherein the magnitude of the information flow of a coded useful signal is reduced in steps approximately by a wholenumber factor of n, and n−1 additional signals are transferred in place of the omitted information flow.

8. Method according to claim 2, wherein said masking thresholds are obtained based on the values of all components under consideration of the natural effects of pre-masking, simultaneous masking and post-masking, wherein
pre-masking takes place in a time region before a respective masking audio signal has been switched on, and
post-masking takes place after the respective signal has been switched off.

9. Method according to claim 8, wherein the step of obtaining masking thresholds includes consideration of temporal masking characteristics and is based on component level values available within a time window of about 500 ms.

10. Method according to claim 2, wherein components whose level values lie below the said masking thresholds are not coded or are coded only with low resolution.

11. Method according to claim 2, wherein control information obtained from said masking thresholds is transferred with the coded components for requantization in the reconstruction step.

12. Method according to claim 11, wherein, before transmission, the control information is subjected to greater error protection than the coded components.

13. Method according to claim 2, further comprising the step of providing audio signals with a degree of error protection, wherein the determining step determines the spectral and temporal structure of a digital audio signal and the quantity of information for error protection is determined on the basis of the spectral and temporal structure of the digital audio signal, such that for audio signals requiring a small total information flow for transmission, a high degree of error protection is provided and for audio signals requiring a large total information flow for transmission, a lower degree of error protection is provided.

14. Method according to claim 13, wherein the signal-dependent degree of error protection is dimensioned such that subjective interference caused by bit errors is not greater for slightly masked audio signals than for strongly masked audio signals.

15. Method according to claim 2, wherein the plurality of spectral, quantized components are provided by dividing digitalized audio signals into sub-band signals according to a number of frequency bands, said sub-bands signals comprising time discrete, qualified sample values.

16. Method according to claim 15, wherein the sub-band signals are dimensioned such that aliasing distortions created during the division of the digitalized audio signal into sub-band signals lie below the masking thresholds of the human auditory system.

17. Method according to claim 16, wherein the determining step includes a number of classification steps which determine a scale factor for each digitalized sub-band signal, said scale factor classifying the peak value of the sub-band signal level within a defined time interval; the resolution of each sub-band signal is set in the step of changing the quantizing on the basis of the determined scale factors which are transferred together with coded sub-band signals; and the transferred scale factors are utilized in the decoding step to reconstruct the original sub-band signal.

18. Method according to claim 17, wherein the number of classification steps for the determination of the scale factor is selected such that a perceptibility threshold for level changes within the associated sub-band is not exceeded.

19. Method according to claim 17, wherein the time interval for the classification of the peak value of the respective sub-band signal is determined to correspond to the temporal masking of the human auditory system and according to the temporal structure of the sub-band signal within the associated sub-band.

20. Method according to claim 17, wherein said sub-band signals are divided into a plurality of blocks, each block of a sub-band signal comprises a sequence of sample values and is divided in a first half and a second half, and the scale factor is determined only for the first half of each block and, for the second half of each block, the determined scale factor of the first half of the same block or of the subsequent block is employed.

21. Method according to claim 20, wherein said masking thresholds for changing the quantization of the sample values are obtained on the basis of a selected spectral analysis of the digital audio signal.

22. Method according to claim to 20, wherein the scale factor of a sub-band contains information indicating that the sample values of the sub-band are zero within one block and are not transmitted.

23. Method according to claim 17, wherein, said masking thresholds for changing the quantization of the sample values in the sub-bands are obtained from the determined scale factors of the sub-band signals.

24. Method according to claim 17, further comprising the step of providing audio signals with error protection, wherein the scale factors are subjected to greater error protection than the coded sample values of the sub-band signals.

25. Method according to claim 17, further comprising the step of providing audio signals with error protection, wherein the error protection of scale factors or control information in sub-bands of greater relative bandwidth is higher than in sub-bands of smaller relative bandwidth.

26. Method according to claim 15, further providing audio signals with error protection, wherein the sample values of sub-bands of a greater relative width are subjected to greater error protection than sample values of sub-bands having a smaller relative bandwidth.

27. Method according to claim 15, wherein sample values below said threshold level of the respective sub-band signal are not transferred.

28. Method according to claim 2, wherein the magnitude of the available total information flow is approximately equal to the required total information flow.

29. Method according to claim 2, wherein the produced quantizing noise levels of the components lie above said masking thresholds.

* * * * *